US009177477B2

(12) United States Patent
Mochizuki et al.

(10) Patent No.: US 9,177,477 B2
(45) Date of Patent: Nov. 3, 2015

(54) COLLISION WARNING SYSTEM USING DRIVER INTENTION ESTIMATOR

(75) Inventors: Yutaka Mochizuki, Tochigi (JP); Kei Ishikawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 826 days.

(21) Appl. No.: 13/183,794

(22) Filed: Jul. 15, 2011

(65) Prior Publication Data

US 2012/0016581 A1 Jan. 19, 2012

Related U.S. Application Data

(60) Provisional application No. 61/365,725, filed on Jul. 19, 2010.

(51) Int. Cl.

| | |
|---|---|
| ***G06F 17/10*** | (2006.01) |
| ***G06G 7/78*** | (2006.01) |
| ***G08G 1/16*** | (2006.01) |

(52) U.S. Cl.

CPC ................ *G08G 1/161* (2013.01); *G08G 1/162* (2013.01); *G08G 1/163* (2013.01); *G08G 1/166* (2013.01); *G08G 1/167* (2013.01)

(58) Field of Classification Search

CPC ......... G08G 1/16; G08G 1/161; G08G 1/166; G08G 1/162; G08G 1/163; G08G 1/167

USPC ............... 701/23, 41, 45, 46, 48, 70, 96, 300, 701/301, 302; 340/435, 436, 464, 438, 439, 340/417, 418, 919, 929, 932, 902, 903, 990

See application file for complete search history.

(56) References Cited

U.S. PATENT DOCUMENTS

| | | | | |
|---|---|---|---|---|
| 3,778,826 | A | 12/1973 | Flannery et al. | |
| 5,923,293 | A * | 7/1999 | Smith et al. | 342/455 |
| 5,983,161 | A | 11/1999 | Lemelson et al. | |
| 6,209,909 | B1 | 4/2001 | Breed | |
| 6,275,773 | B1 | 8/2001 | Lemelson et al. | |
| 6,289,332 | B2 | 9/2001 | Menig et al. | |
| 6,343,810 | B1 | 2/2002 | Breed | |
| 6,343,869 | B1 | 2/2002 | Kobayashi | |
| 6,487,500 | B2 * | 11/2002 | Lemelson et al. | 701/301 |
| 6,623,033 | B2 | 9/2003 | Breed | |
| 6,624,782 | B2 * | 9/2003 | Jocoy et al. | 342/70 |
| 6,646,589 | B2 | 11/2003 | Natsume | |

(Continued)

FOREIGN PATENT DOCUMENTS

| | | |
|---|---|---|
| JP | 2002183889 | 6/2002 |
| JP | 2006082692 | 3/2006 |
| JP | 2008021181 | 1/2008 |

OTHER PUBLICATIONS

Arda, Hybrid-State DriverVehicle Modelling, Estimation and Prediction, 2010.*

(Continued)

*Primary Examiner* — Jason Holloway
*Assistant Examiner* — Rachid Bendidi
(74) *Attorney, Agent, or Firm* — Plumsea Law Group, LLC

(57) ABSTRACT

A collision warning system for a subject vehicle is disclosed. The collision warning system uses data relating to the subject vehicle and a target vehicle in an algorithm to estimate the intention of the driver of the subject vehicle. The system uses historic data to improve the algorithm to obtain more accurate estimates.

46 Claims, 18 Drawing Sheets

(56) References Cited

U.S. PATENT DOCUMENTS

| | | | | |
|---|---|---|---|---|
| 6,755,273 | B2 | 6/2004 | Breed | |
| 6,885,968 | B2 | 4/2005 | Breed et al. | |
| 6,918,459 | B2 | 7/2005 | Breed | |
| 7,049,945 | B2 | 5/2006 | Breed et al. | |
| 7,190,260 | B2 | 3/2007 | Rast | |
| 7,209,221 | B2 | 4/2007 | Breed et al. | |
| 7,274,988 | B2 * | 9/2007 | Mukaiyama | 701/301 |
| 7,359,782 | B2 | 4/2008 | Breed | |
| 7,388,513 | B2 | 6/2008 | Kubo | |
| 7,444,240 | B2 * | 10/2008 | Macneille et al. | 701/300 |
| 7,729,858 | B2 * | 6/2010 | Koike et al. | 701/301 |
| 7,848,886 | B2 * | 12/2010 | Kawasaki | 701/301 |
| 8,000,897 | B2 * | 8/2011 | Breed et al. | 701/301 |
| 2002/0105423 | A1 | 8/2002 | Rast | |
| 2005/0057372 | A1 * | 3/2005 | Taylor | 340/901 |
| 2005/0073433 | A1 | 4/2005 | Gunderson et al. | |
| 2005/0197771 | A1 * | 9/2005 | Seick et al. | 701/301 |
| 2005/0273215 | A1 | 12/2005 | Kuge | |
| 2005/0273258 | A1 * | 12/2005 | MacNeille et al. | 701/300 |
| 2006/0119473 | A1 | 6/2006 | Gunderson et al. | |
| 2007/0043491 | A1 | 2/2007 | Goerick et al. | |
| 2007/0260392 | A1 * | 11/2007 | Paolini et al. | 701/117 |
| 2007/0282532 | A1 * | 12/2007 | Yamamoto et al. | 701/301 |
| 2008/0015755 | A1 | 1/2008 | Kuwahara et al. | |
| 2008/0040004 | A1 | 2/2008 | Breed | |
| 2008/0046150 | A1 | 2/2008 | Breed | |
| 2008/0091323 | A1 | 4/2008 | Kuwahara et al. | |
| 2008/0294301 | A1 | 11/2008 | Kaigawa et al. | |
| 2008/0300733 | A1 * | 12/2008 | Rasshofer et al. | 701/1 |
| 2008/0312802 | A1 | 12/2008 | Kaigawa et al. | |
| 2009/0082949 | A1 * | 3/2009 | Petrie et al. | 701/119 |
| 2011/0087433 | A1 * | 4/2011 | Yester | 701/301 |

OTHER PUBLICATIONS

Hafner, Automated Vehicle-to-Vehicle Collision avoidance at intersection, 2011.*

Gadepslly, DriverVehicle State Estimation and Detection, 2011.*

Arda, Hybrid State System Development for Autonomous Vehicle Control in Urban, 2008.*

* cited by examiner

| | TV turn left | TV turn right | TV path through | TV stop | TV stopping | TV start |
|---|---|---|---|---|---|---|
| HV turn left | Uncertain | Uncertain | Cross path | No cross path | No cross path | Uncertain |
| HV turn right | Uncertain | No cross path | Uncertain | No cross path | No cross path | Uncertain |
| HV path through | Cross path | Uncertain | No cross path | No cross path | No cross path | Uncertain |
| HV stop | No cross path | No cross path | No cross path | No cross path | No cross path | No cross path |
| HV stopping | No cross path | No cross path | No cross path | No cross path | No cross path | No cross path |
| HV start | Uncertain | Uncertain | Uncertain | No cross path | No cross path | Uncertain |

FIG. 16

| Approach | Target/Subject | Stop | Go Through | Left Turn | Right Turn |
|---|---|---|---|---|---|
| Same | Stop | S | S | S | S |
| | Go Through | S | S | S | S |
| | Left Turn | S | S | S | S |
| | Right Turn | S | S | S | S |
| Ahead | Stop | S | S | S | S |
| | Go Through | S | S | U | S |
| | Left Turn | S | U | S | U |
| | Right Turn | S | S | U | S |
| Left | Stop | S | S | S | S |
| | Go Through | S | U | U | U |
| | Left Turn | S | U | U | S |
| | Right Turn | S | S | S | S |
| Right | Stop | S | S | S | S |
| | Go Through | S | U | U | S |
| | Left Turn | S | U | U | S |
| | Right Turn | S | U | S | S |

FIG. 17

COLLISION WARNING SYSTEM USING DRIVER INTENTION ESTIMATOR

This application claims the benefit of U.S. Provisional Application No. 61/365,725, filed Jul. 19, 2010, which is herein incorporated by reference in its entirety.

BACKGROUND

1. Field of the Embodiments

The present embodiments relate to motor vehicles and in particular to a collision warning system including a driver intention estimator for a motor vehicle.

2. Description of Related Art

Collision warning systems have been previously proposed. Collision warning systems can alert a driver to potential hazards posed by other vehicles or objects near or on a roadway. Some collision warning systems use visual and/or audible messages to alert a driver of potential collisions.

SUMMARY OF THE EMBODIMENTS

The embodiments disclose a method of controlling a collision warning system according to driver intention estimates. The embodiments can be used in connection with a motor vehicle. The term "motor vehicle" as used throughout the specification and claims refers to any moving vehicle that is capable of carrying one or more human occupants and is powered by any form of energy. The term motor vehicle includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the embodiments provide a method of operating a collision warning system in a motor vehicle, comprising the steps of: receiving information related to a subject vehicle; receiving information related to the target vehicle; calculating the state of the target vehicle; using an algorithm to predict the intention of a driver of the target vehicle as the target vehicle approaches an intersection; and using the predicted intentions of the driver of the target vehicle to provide alerts through the collision warning system.

In another aspect, the embodiments provide a method of operating a collision warning system in a motor vehicle, comprising the steps of: receiving information related to a subject vehicle; receiving information related to a target vehicle; calculating the state of the target vehicle; and using an algorithm to predict the intention of the driver of the target vehicle as the target vehicle approaches an intersection. The collision warning system predicts the intention of the driver of the target vehicle, a vehicle collision point is estimated, and time and distance to the estimated collision point is calculated. If the time to the estimated collision point is less than a first predetermined quantity and more than a second predetermined quantity, the collision warning system provides an informing alert to the driver of the object vehicle. If the time to the estimated collision point is less than the second predetermined quantity, the collision warning system provides a warning alert to the driver of the object vehicle.

In another aspect, the embodiments provide a method of operating a collision warning system in a motor vehicle, comprising the steps of: using information received from a target vehicle to predict the intentions of a driver of the target vehicle as the target vehicle approaches an intersection and using the predicted intentions of the driver of the target vehicle to provide alerts through the collision warning system. The predicted intentions of the driver of the target vehicle are compared to the actual actions of the driver of the target vehicle, and probabilities of states of the target vehicle are used in the algorithm are updated when the predicted intentions of the driver of the target vehicle and the actual actions of the driver of the target vehicle are not the same.

Other systems, methods, features and advantages of the embodiments will be, or will become, apparent to one of ordinary skill in the art upon examination of the following figures and detailed description. It is intended that all such additional systems, methods, features and advantages included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 16 is one embodiment of a look-up table for a method of estimating unsafe conditions; and FIG. 17 is another embodiment of a look-up table for a method of estimating unsafe conditions.

DETAILED DESCRIPTION OF THE EXEMPLARY EMBODIMENTS

Figure 1:
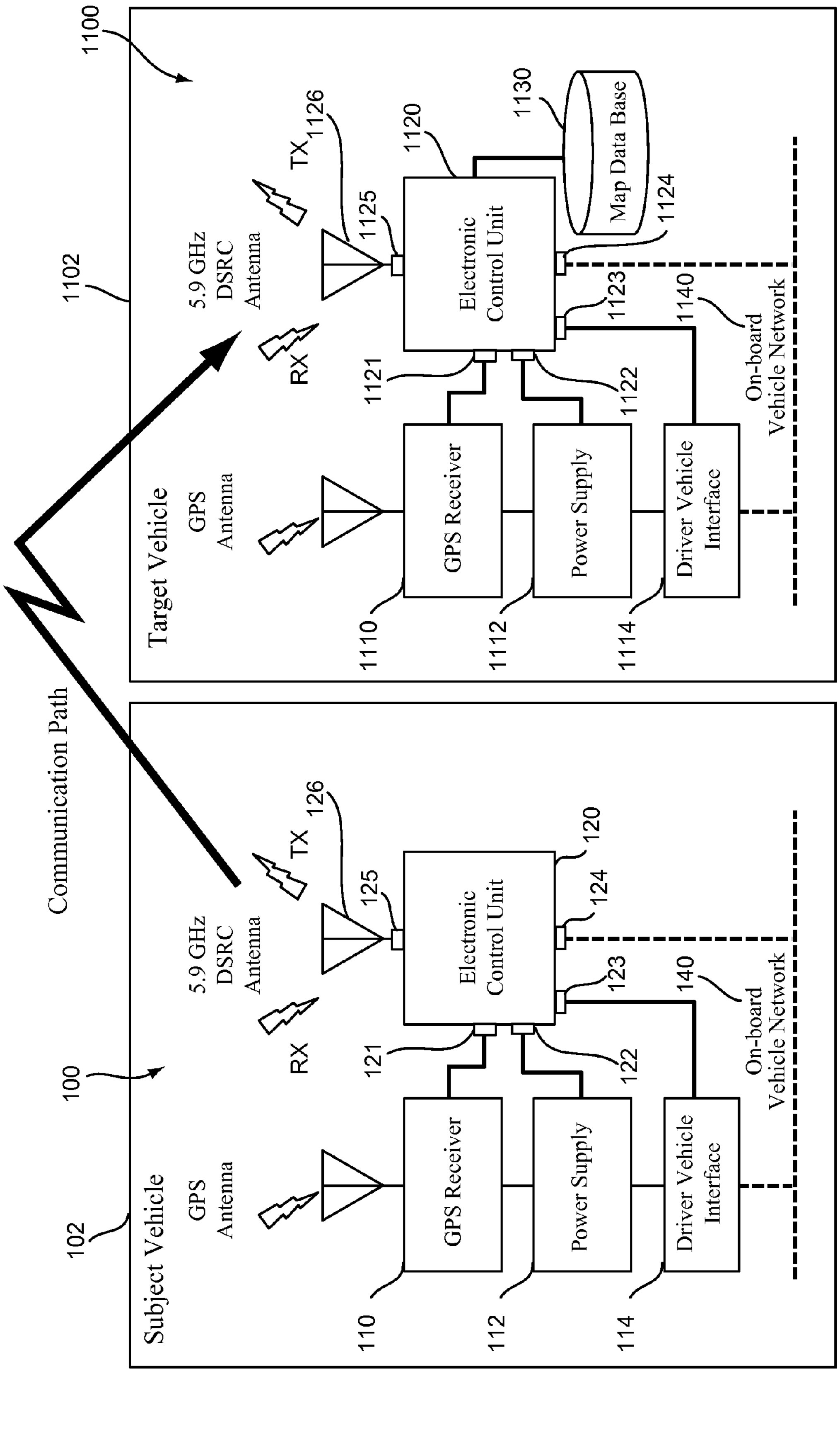
FIG. 1 is one embodiment of a vehicular communication collision warning system.

FIG. 1 is a hardware diagram of an embodiment of a vehicle communication network between collision warning system 100 that is configured to be used within motor vehicle 102 and a warning system 1100 that is configured to be used within motor vehicle 1102. Reference numbers of FIG. 1 not in parentheses above indicate components of a "subject" vehicle and the reference numbers of FIG. 1 in parentheses above indicate components of a "target" vehicle.

The term "target vehicle" as used throughout this detailed description and in the claims refers to any vehicle about which a collision warning system could issue an alert. Furthermore, for clarity, a vehicle possessing a collision warning system may be referred to as a "subject vehicle", in contrast to the target vehicle. In particular, motor vehicle 102 is the subject vehicle in this embodiment and motor vehicle 1102 is the target vehicle in this embodiment.

A collision warning system can include provisions for communicating with one or more vehicles using a vehicle communication network, as shown in FIG. 1. The term "vehicle communication network" as used throughout this detailed description and in the claims refers to any network utilizing motor vehicles and roadside units as nodes. Vehicle communication networks may be used for exchanging various types of information between motor vehicles and/or roadside units. An example of such a vehicular communication network is a dedicated short range communication (DSRC) network, which may be governed by SAE J2735, IEEE 1609 as well as 802.11 standards. In some embodiments, a vehicle communication network, such as a DSRC network, may be configured to operate in the 5.9 GHz band with bandwidth of approximately 75 MHz. In other cases, a vehicle communication network can operate in any other band and may have any bandwidth. Furthermore, in some cases, a vehicle communication network may have a range of approximately 1000 meters. In other cases, the range of a vehicle communication network can be greater than 1000 meters. In still other cases, the range of a vehicle communication network can be less than 1000 meters.

Except for map database 1130 of target vehicle 1102, of which a similar map database may or may not be present subject vehicle 102, the collision warning systems are similar and a generic collision warning system 100 for a vehicle 102 will be described except as noted. Descriptions in this specification, unless otherwise noted, will be from the point of view of the driver of the subject vehicle.

Collision warning system 100 may be a system configured to detect potential collisions as well as to alert a driver or passenger to potential collisions. For purposes of clarity, only some components of a motor vehicle 102 that may be relevant to collision warning system 100 are illustrated. Furthermore, in other embodiments, additional components can be added or removed.

Collision warning system 100 may include provisions for receiving GPS information. In some cases, collision warning system 100 can include GPS receiver 110. In one embodiment, GPS receiver 110 can be used for gathering GPS information for any systems of a motor vehicle, including, but not limited to: GPS based navigation systems.

Collision warning system 100 can include provisions for powering one or more devices. In some cases, collision warning system 100 can include power supply 112. Generally, power supply 112 can be any type of power supply associated with a motor vehicle. In some embodiments, power supply 112 can be a car battery. In other embodiments, power supply 112 can be another type of power supply available for a motor vehicle 102.

Collision warning system 100 may include provisions for communicating with a driver. In some embodiments, collision warning system 100 can include driver vehicle interface 114. In some cases, driver vehicle interface 114 can include provisions for transmitting information to a driver and/or passenger. In other cases, driver vehicle interface 114 can include provisions for receiving information from a driver and/or passenger. In an exemplary embodiment, driver vehicle interface 114 can include provisions for transmitting and receiving information from a driver and/or passenger.

Motor vehicle 102 may include provisions for communicating, and in some cases controlling, the various components associated with collision warning system 100. In some embodiments, collision warning system 100 may be associated with a computer or similar device. In some embodiments, the vehicle may have a microprocessor having a central processing unit. The microprocessor may have electronic memory, such as RAM and/or ROM, as well as software. In the current embodiment, collision warning system may include electronic control unit 120, hereby referred to as ECU 120. In some embodiments, the ECU 120 may be a microprocessor. In one embodiment, ECU 120 may be configured to communicate with, and/or control, various components of collision warning system 100. In addition, in some embodiments, ECU 120 may be configured to control additional components of a motor vehicle that are not shown.

ECU 120 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 120 are optional. Some embodiments may include a given port or provision, while others may exclude it. The following description discloses many of the possible ports and provisions that can be used, however, it should be kept in mind that not every port or provision must be used or included in a given embodiment.

In some embodiments, ECU 120 can include first port 121 for communicating with GPS receiver 110. In particular, ECU 120 may be configured to receive GPS information from GPS receiver 110. In addition, ECU 120 can include second port 122 for receiving power from power supply 112. Also, ECU 120 can include third port 123 for communicating with driver vehicle interface 114. In particular, ECU 120 can be configured to transmit information to driver vehicle interface 114, as well as to receive information from driver vehicle interface 114.

In some embodiments, ECU 120 may include fifth port 125 that is configured to communicate with one or more DSRC devices. In an exemplary embodiment, fifth port 125 may be associated with a DSRC antenna 126 that is configured to transmit and/or receive vehicle information over one or more vehicle communication networks.

Collision warning system 100 can include provisions for communicating with one or more components of a motor vehicle that are not associated directly, or indirectly with collision warning system 100. In some cases, ECU 120 may include additional ports for communicating directly with one or more additional devices of a motor vehicle, including various sensors or systems of the motor vehicle. In an exemplary embodiment, ECU 120 may include fourth port 124 for communicating with on-board vehicle network 140. By providing communication between ECU 120 and on-board vehicle network 140, ECU 120 may have access to additional information concerning motor vehicle 102. For instance, in some cases, ECU 120 may be configured to receive information related to various operating conditions of a motor vehicle. Examples of information that may be received via on-board vehicle network 140 include, but are not limited to: vehicle speed, engine speed, braking conditions, as well as other parameters associated with the operating condition of motor vehicle 102.

In some embodiments, the ECU may be electronically connected to various sensors through ports. For example, the ECU may be electronically connected via a port to a braking sensor which detects the amount of braking pressure applied. In some embodiments, the ECU may be electronically connected via a port to a speed sensor which measures the current velocity of the vehicle. In some embodiments, the ECU may be electronically connected via a port to a sensor that measures the rotational velocity of the engine. In some embodiments, the ECU may be electronically connected via a port to a turn signal indicator, which indicates whether the driver has activated a turn signal. In some embodiments, the ECU may be electronically connected to gyros or some other device that measure yaw. In some embodiments, the ECU may be electronically connected via a port to a steering wheel sensor, which indicates the steering wheel angle position. In some embodiments, the ECU may be electronically connected via ports to a torque meter, which measures the amount of load or torque placed on the engine. The ECU may also be electronically connected to various other sensors that are known to those skilled in the art.

For purposes of clarity, target vehicle 1102 is labeled with substantially similar components to the components discussed above for motor vehicle 102. In particular, target vehicle 1102 can include receiver 1110, power supply 1112, driver vehicle interface 1114, on-board vehicle network 1140, and antenna 1126 in communication with ECU 1120 via port 1121, port 1122, port 1123, port 1124 and port 1125, respectively. ECU 1120 can also be connected to map database 1130. These components may function in a like manner to the corresponding components of motor vehicle 102.

Figure 2:
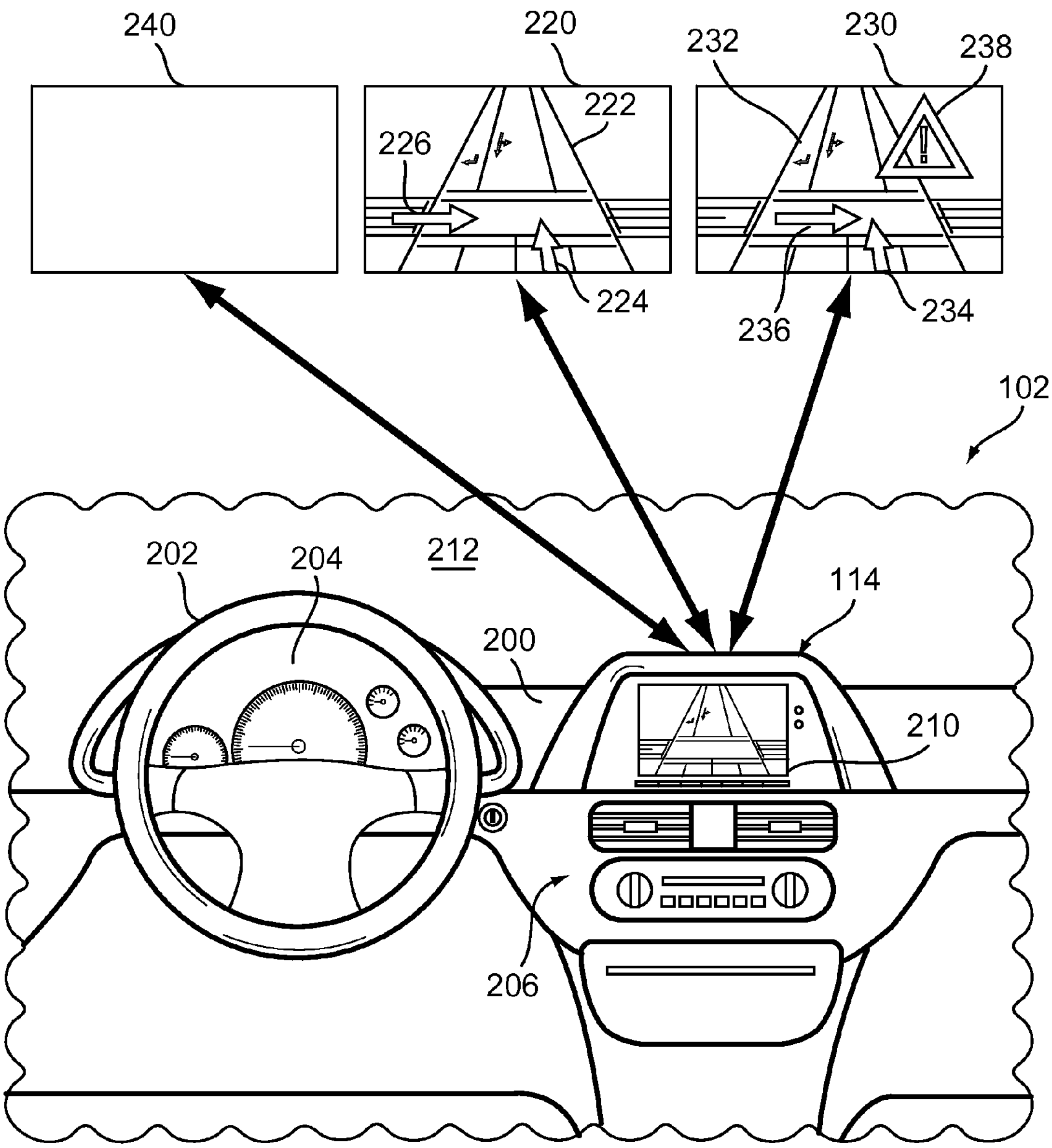
FIG. 2 is a schematic view of an embodiment of alert images for a collision warning system.

FIG. 2 illustrates an embodiment of dashboard 200 for motor vehicle 102. Dashboard 200 may include steering wheel 202 and instrument panel 204. In some embodiments, dashboard 200 can further include center portion 206. In some cases, center portion 206 can include one or more devices associated with an interior of a motor vehicle. Examples include, but are not limited to: audio devices, video devices, navigation devices, as well as any other types of devices. In addition, center portion 206 can be associated with controls for one or more systems of motor vehicle 102 including, but not limited to: climate control systems and other types of systems.

A motor vehicle can include provisions for displaying information from a collision warning system. In some embodiments, a motor vehicle can include a display device of some kind. In some cases, a motor vehicle can include a video screen for displaying information from a collision warning system. Examples of display devices include, but are not limited to: LCDs, CRTs, ELDs, LEDs, OLEDs, as well as other types of displays. In other cases, a display device could be a projection type display device that is configured to project an image onto one or more surfaces of motor vehicle 102. It will be understood that a display device may not be limited to a video screen or projection type display device.

In one embodiment, motor vehicle 102 can include display device 210. In some cases, display device 210 may be associated with driver vehicle interface 114 of collision warning system 100. In particular, display device 210 may be configured to present visual information received from collision warning system 100. In an exemplary embodiment, display device 210 may be an LCD screen.

In some embodiments, display device 210 can be disposed within center portion 206. However, it will be understood that in other embodiments, display device 210 can be located in any portion of motor vehicle 102 as long as display device 210 can be viewed by a driver. For example, in another embodiment, display device 210 may be a projection type device that displays an image onto front window 212. In addition, while display device 210 can be configured to present visual information received from collision warning system 100, display device 210 may be shared with other devices or systems within motor vehicle 102. For example, display device 210 could also be used as a screen for a navigation system.

It will be understood that in some embodiments, a driver vehicle interface can include additional provisions beyond a display screen. For example, in another embodiment, a driver vehicle interface can also be associated with one or more input devices that allow a driver to control various aspects of a collision warning system. In some cases, a driver vehicle interface can include an on/off button for turning a collision warning system on and off. In still another embodiment, a driver vehicle interface can be associated with speakers for generating auditory information.

A display device for a collision warning system can be configured to display one or more images associated with various types of alerts of the collision warning system. For purposes of clarity, the following detailed description discusses a collision warning system using two distinct alert types: informing alerts and warning alerts. In particular, informing alerts are used to inform a driver of nearby vehicles or objects that could pose potential problems at a later time. In contrast, a warning alert may be issued to warn the driver of a serious threat of collision with a nearby vehicle or object. In other words, informing alerts inform a driver of low level collision threats, while warning alerts inform a driver of high level collision threats. In other embodiments, any other number of alert types can be used. In some cases, three or more alert types could be issued by a collision warning system.

In one embodiment, collision warning system 100 includes informing alert image 220 that is associated with an informing alert. Informing alert image 220 may comprise one or more symbols or icons. In this embodiment, informing alert image 220 includes intersection symbol 222, which indicates an upcoming intersection. In addition, informing alert image

220 may include first arrow 224, representing the general location and heading of motor vehicle 102, and second arrow 226, representing the general location and heading of an approaching vehicle for which there may be some threat of collision. By displaying informing alert image 220, a driver is alerted to a potential collision threat with an approaching vehicle. This information may help a driver to be more aware as motor vehicle 102 approaches the upcoming intersection.

In one embodiment, collision warning system 100 also includes warning alert image 230 that is associated with a warning alert. Warning alert image 230 may comprise one or more symbols or icons. In a similar manner to informing alert image 220, warning alert image 230 may include intersection symbol 232, first arrow 234 and second arrow 236. These symbols indicate information about an upcoming intersection as well as the speeds and headings of motor vehicle 102 and an approaching vehicle. In addition, warning alert image 230 includes warning symbol 238. The appearance of warning symbol 238 alerts a driver to an immediate threat posed by an approaching vehicle. This information may help a driver to avoid a collision by taking immediate action.

In addition to the two types of alerts discussed above, a display device may be configured to display no image when no alert has been issued by collision warning system 100. In this embodiment, display device 210 displays default screen 240 when no alert is issued. In one, default screen 240 is associated with a blank screen of display device 210. However, in embodiments where display device 210 is used for displaying information from other systems, default screen 240 may not be a blank screen. For example, in embodiments where display device 210 is shared between a navigational system and collision warning system 100, display device 210 may continue to display images received from the navigation system until an alert is issued. Likewise, once an alert has expired, display device 210 may return to displaying images from a navigation system.

Although a single image is shown for each type of alert (informing alerts and warning alerts) in the current embodiment, other embodiments can include more than one image for each type of alert. In particular, an arrow used to indicate position and heading of a vehicle can be changed from a straight arrow indicating the intention of a vehicle to pass straight through an intersection to curved arrows in cases where the intention of the vehicle is to turn at the intersection. This arrangement can help to inform a driver as to the intentions of an approaching vehicle. In addition, a three way intersection symbol can be used in place of a four way intersection symbol in cases where the upcoming intersection is a three way intersection. However, in embodiments using multiple images for each type of alert, it will be understood that some distinguishing elements may be used to indicate that an alert is an informing alert or a warning alert. For example, as in the current embodiment, a warning symbol can be used to distinguish between informing alerts and warning alerts. Likewise, in some cases, informing alerts can be associated with a different color than warning alerts. In one embodiment, informing alerts can include symbols or icons colored in yellow, while warning alerts can include symbols or icons colored in red. In some embodiments an audio signal is issued which informs the driver of the informing or warning alert.

Figure 3:
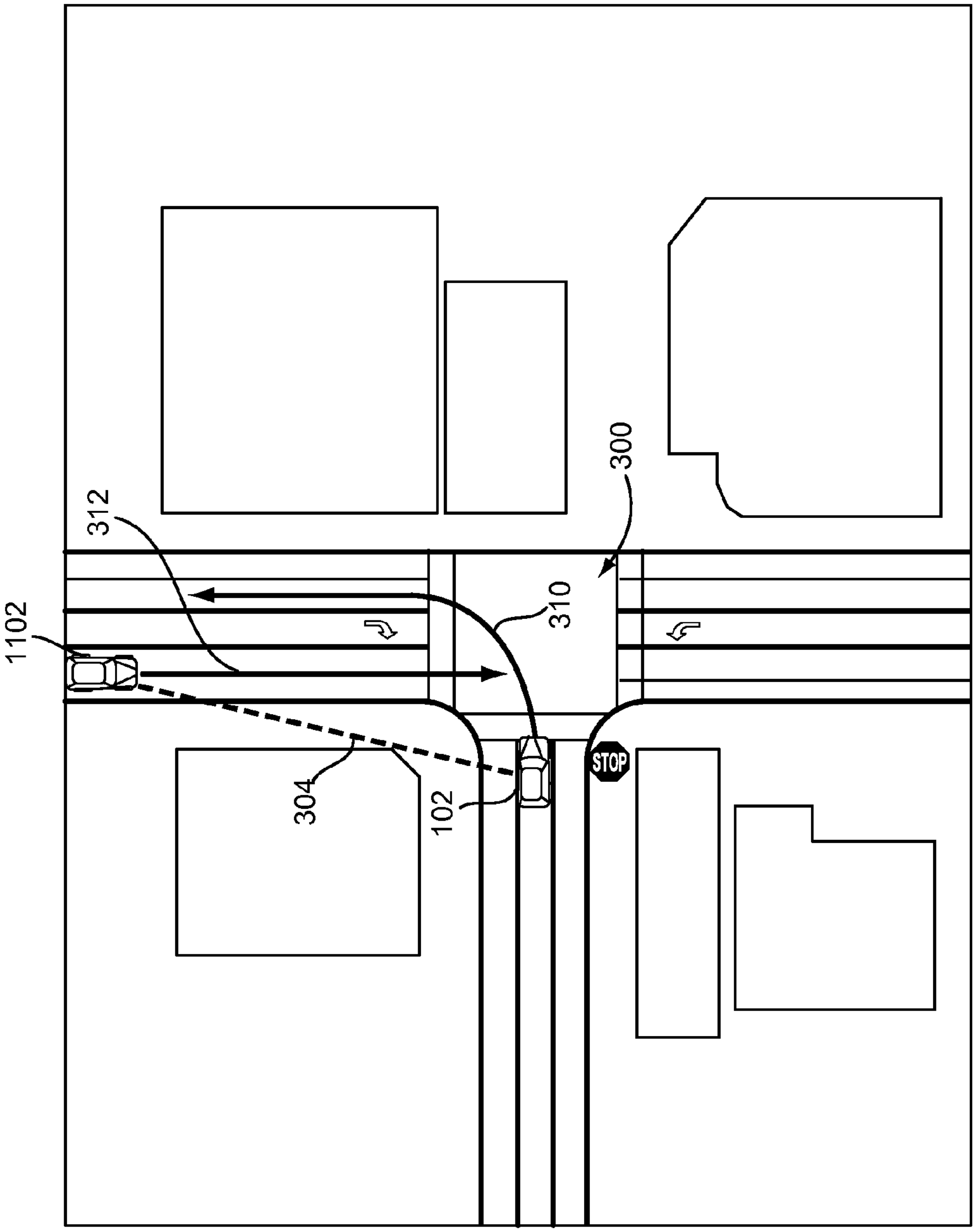
FIG. 3 is a plan view of an embodiment of an encounter at an intersection between a subject vehicle and a target vehicle.
Figure 4:
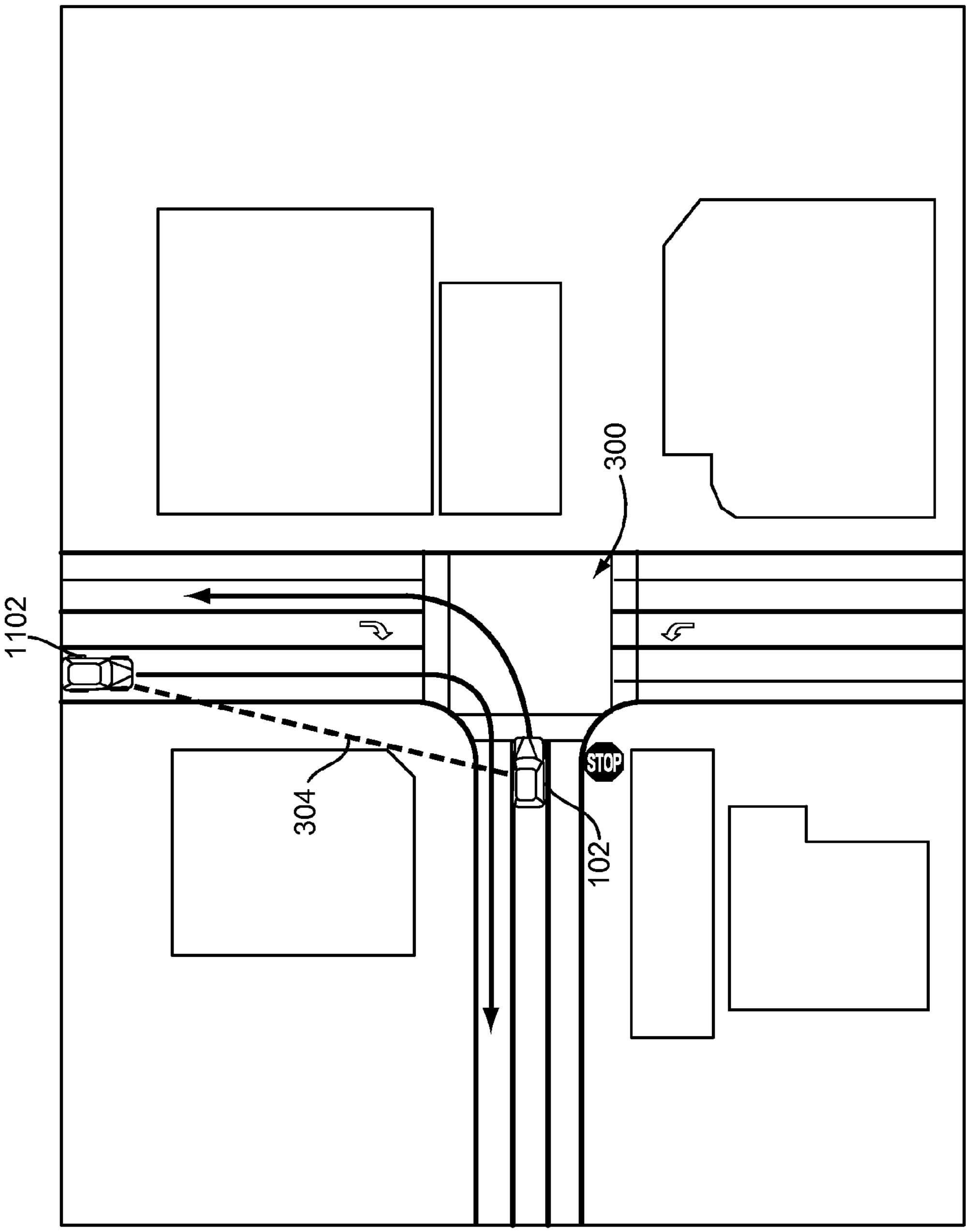
FIG. 4 is another plan view of an embodiment of an encounter at an intersection between a subject vehicle and a target vehicle.
Figure 5:
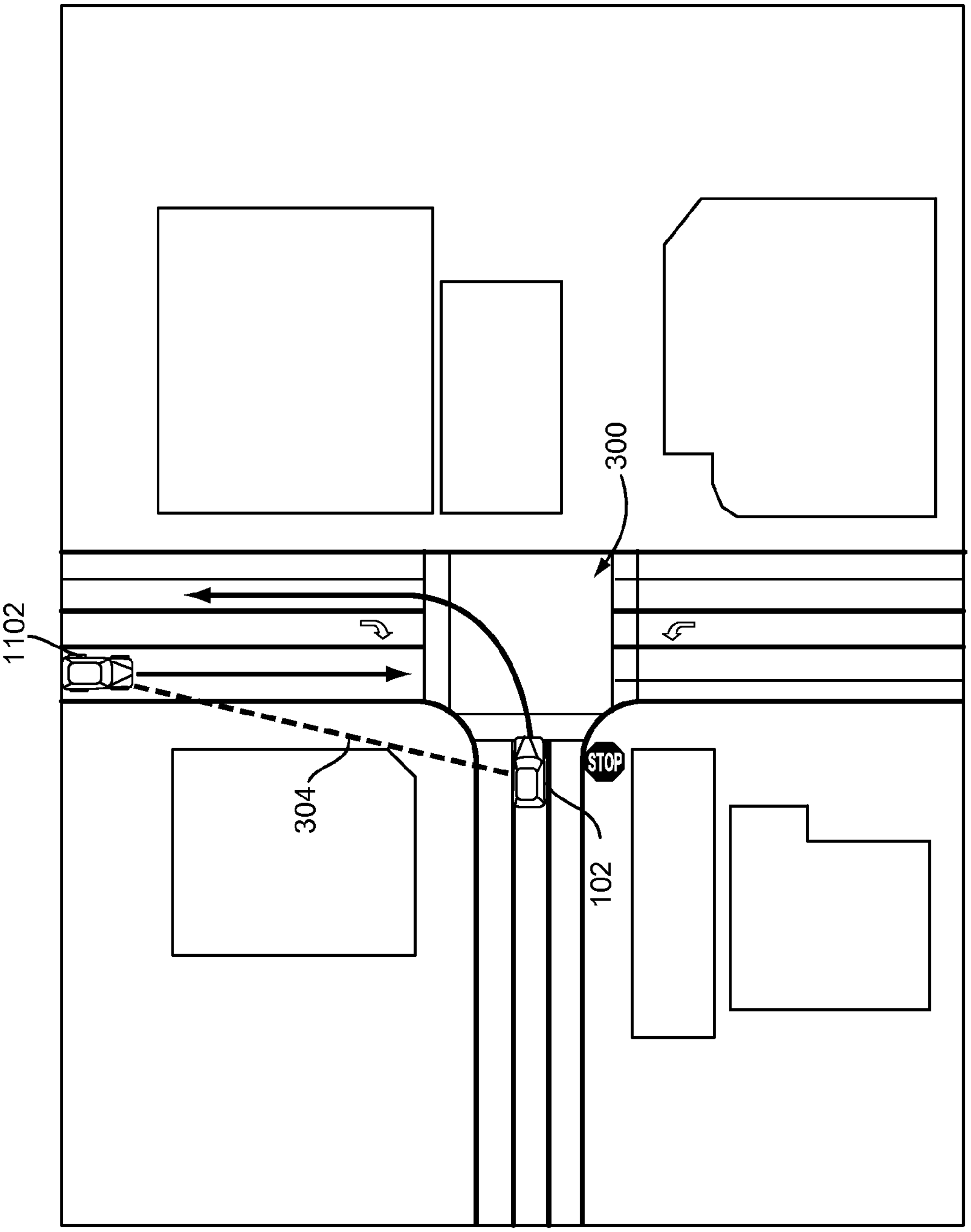
FIG. 5 is another plan view of an embodiment of an encounter at an intersection between a subject vehicle and a target vehicle

FIGS. 3-5 illustrate embodiments of a collision warning system in use. As previously discussed, motor vehicle 102 and motor vehicle 1102 include collision warning system 100 and collision warning system 1100, respectively. In particular, motor vehicle 102 includes provisions for communicating with one or more vehicles using a vehicle communication network. Also, motor vehicle 102 includes provisions for alerting a driver of potential collisions using either informing alerts or warning alerts.

Referring to FIG. 3, motor vehicle 102 is in communication with target vehicle 1102 using vehicle communication network 304. In some cases, vehicle communication network 304 may be a DSRC network, as discussed above. In particular, using vehicle communication network 304, motor vehicle 102 and target vehicle 1102 may be configured to exchange various types of information including, but not limited to: vehicle position, vehicle speed, vehicle heading, vehicle acceleration, turning information (blinker state), yaw rate, steering wheel angle, distance between two vehicles, brake status, brake history, traveling lane information (such as dedicated right turn lane), distance to intersection as well as other types of information. In addition, any type of basic safety message (BSM) can be exchanged via vehicle communication network 304.

In one embodiment, each vehicle associated with vehicle communication network 304 is presumed to have a GPS antenna to determine vehicle locations. Using vehicle location information, velocities and headings for each vehicle can also be computed. In some cases, target vehicle 1102 may simply transmit a current GPS position and motor vehicle 102 may calculate speed and heading according to the current GPS position. In other cases, target vehicle 1102 can transmit each of these values independently.

In this embodiment, after receiving attributes from target vehicle 1102, collision warning system 100 of motor vehicle 102 may determine if an alert should be issued. Since motor vehicle 102 is planning to make a left turn at intersection 300 and target vehicle 1102 is planning to pass straight through intersection 300, there is potentially a threat of collision. In this case, collision warning system 100 may issue an informing alert or a warning alert using informing alert image 220 or warning alert 230, depending on the likelihood of collision. Informing alert image 220 or warning alert image 230 may include arrows. In some embodiments, informing alert image 220 includes a first arrow 310 and second arrow 312, indicating the planned trajectories of motor vehicle 102 and target vehicle 1102, respectively. By displaying informing alert image 220 or warning image 230, collision warning system 100 can inform a driver of motor vehicle 102 to a potential threat posed by target vehicle 1102. Such alerts would be considered "beneficial" alerts because they inform the driver of motor vehicle 102 of an actual potential hazard. The alert may allow the driver of motor vehicle 102 to alter the current planned trajectory in order to avoid a collision.

Referring to FIG. 4, at a later time, target vehicle 1102 is just about to enter intersection 300 to make a right turn as motor vehicle 102 is making a left turn at intersection 300. At this point, collision warning system 100 may determine that the threat of collision is very high if it has no indication of the intentions of the driver of target vehicle 1102. If collision warning system 100 issues a warning alert, the warning may be considered a "nuisance" warning because a right turn by target vehicle 1102 poses no hazard to motor vehicle 102.

Referring to FIG. 5, motor vehicle 102 is planning to make a left turn at intersection 300 and target vehicle 1102 is planning to stop at intersection 300. Thus, the potential for collision is low. However, without an indication of the intentions of the driver of target vehicle 1102, collision warning system 100 of motor vehicle 102 will perceive the situation in FIG. 5 to be exactly the same as the situation in FIG. 3, and issue an alert.

In some cases, a driver may feel that a collision warning system issues too many alerts, especially informing alerts which may inform the driver about situations already known to the driver. For example, in situations where a driver has right of way over a target vehicle, an informing alert displaying the location and trajectory of the target vehicle may be seen as a nuisance. Some drivers may choose to deactivate or modify the collision warning system rather than tolerate these nuisance alerts.

A collision warning system can include provisions for reducing the number of alerts issued to a driver. In some embodiments, a collision warning system can be configured to prevent informing alerts from being issued when a driver intention estimator determines that a target vehicle is unlikely to be a collision threat. In some embodiments, the driver may choose one of a number of sensitivity settings associated with the alerts. Each setting may block some of the alerts based on the category of the alert.

Referring to FIG. 3, motor vehicle 102 is preparing to make a left hand turn at intersection 300, while target vehicle 1102 is planning to pass straight through intersection 300. Collision warning system 100 of motor vehicle 102 cannot directly determine the intentions of the driver of target vehicle 1102. As a result, the method of the present embodiments may rely on easy to observe states of target vehicle 1102 such as vehicle velocity, position, and orientation to estimate the intentions of the driver of target vehicle 1102.

In some embodiments, mathematical methods may be used to more accurately predict the intentions of the drivers of the vehicles. For example, a method known as a Kalman filter may be used. A Kalman filter produces estimates of true values of measurements and its associated calculated values by predicting a value, estimating the uncertainty of the predicted value, and calculating a weighted average of the predicted value and the measured value. Generally, the most weight is given to the value with the least amount of uncertainty.

Collision warning system 100 may filter the states of target vehicle 1102. In some cases, collision warning system 100 may use a Kalman filter to estimate driver intentions for target vehicle 1102. In other cases, other sorts of filters known in the art could be used.

Figure 6:
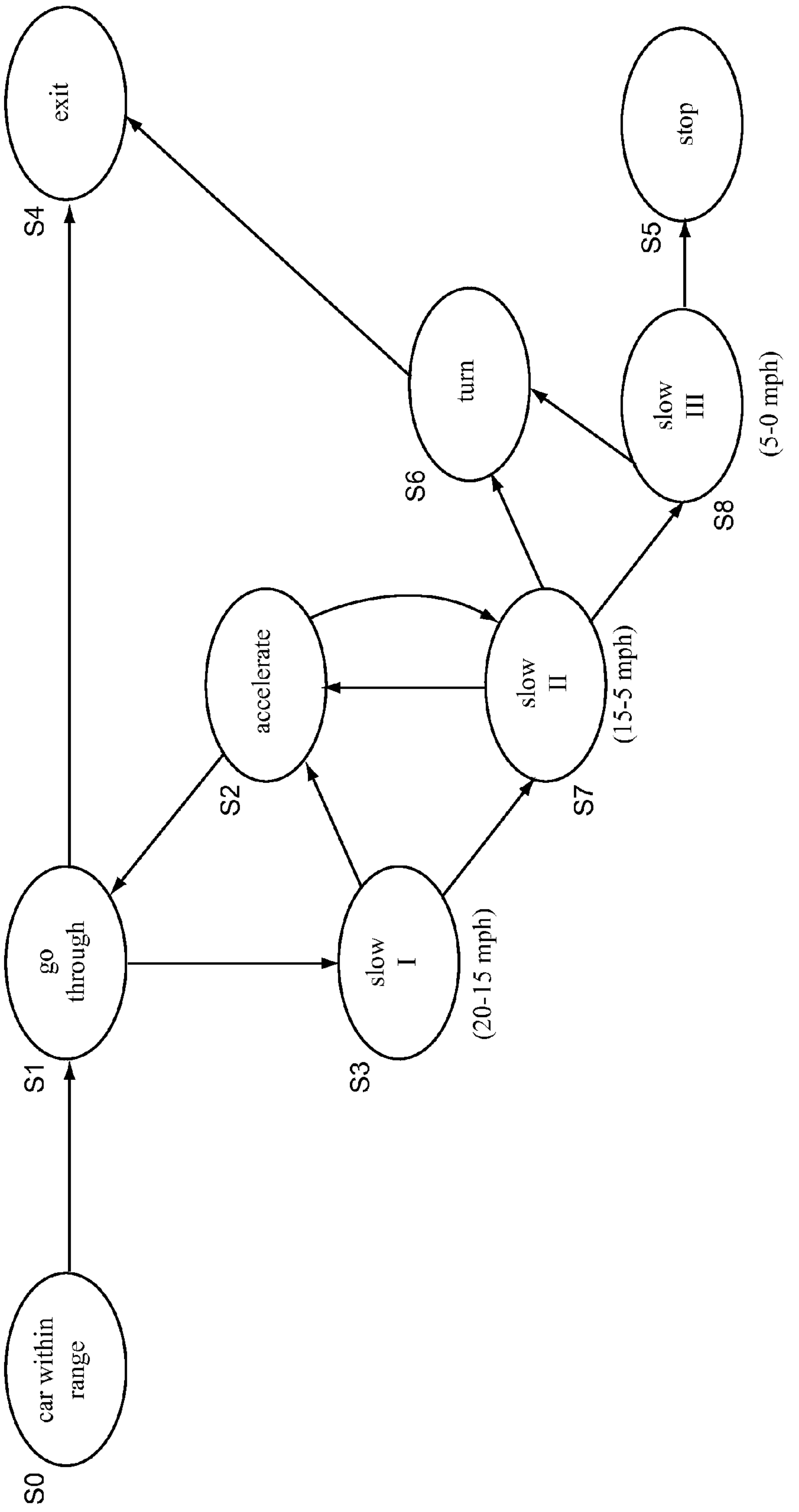
FIG. 6 is one embodiment of a Finite State Machine model for driver behavior at an intersection approach.

FIG. 6 illustrates an embodiment of a filter in the form of a Finite State Machine (FSM) that may be used to estimate the intentions of a driver. The Kalman filtering depicted in FIG. 6 begins at step S0 when target vehicle 1102 is within a given range. In other cases, the range could be less than 120 m. In still other cases, the range could be greater than 120 m. As an example, the given range may be 120 m. As shown in step S1, the initial estimate is that target vehicle 1102 is going through an intersection without stopping.

As shown in FIG. 6, if target vehicle 1102 continues to travel at greater than 20 mph, the FSM model may estimate that target vehicle will continue through the intersection without stopping (S1). If target vehicle 1102 slows to between 15 and 20 mph (S3), and then accelerates (S3-S2), the FSM model may estimate that target vehicle 1102 will go through the intersection (S2-S1) if acceleration is above a threshold level. If acceleration is below a threshold level (S2-S7), the FSM model may estimate that target vehicle 1102 will continue slowing to stop or turn. If target vehicle 1102 continues to slow down to less than 15 mph, and then less than 5 mph, the FSM model may estimate that target vehicle 1102 will stop (S3-S7-S8-S5) or turn (S3-S7-S8). If target vehicle 1102 slows to between 5 and 15 mph, but does not slow to less than 5 mph, the FSM model may estimate that target vehicle 1102 will turn (S3-S7-S6).

The simplified FSM model of FIG. 6 is only for an explanation of the principles of operation of the system. In a functional system, the FSM model may have much greater state resolution, with significant final states kept separated through a number of discrete speed and acceleration brackets. The model may also be built to fit and differentiate an assortment of important intersection approach scenarios.

An actual FSM model may include additional inputs such as vehicle position, vehicle speed, vehicle heading, vehicle acceleration, turning information (blinker state), yaw rate, steering wheel angle, distance between two vehicles, brake status, brake history, traveling lane information (such as dedicated right turn lane), distance to intersection as well as other types of information.

Figure 7A:
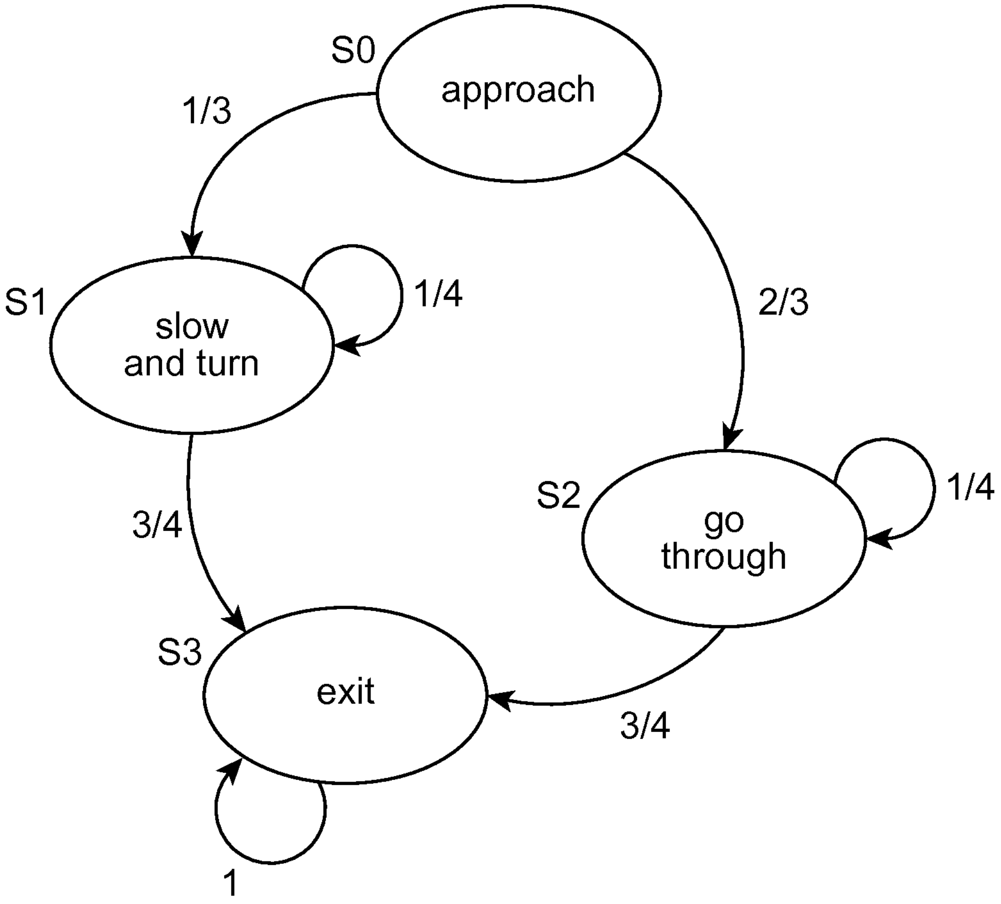
FIG. 7A is another embodiment of a Finite State Machine model.

FIG. 7A shows one embodiment of a simplified finite state machine model. Although the embodiment in FIG. 7A shows four states, other embodiments may include more or less states. The initial state SO represents the target vehicle approaching an intersection. In this particular embodiment, the only final outcome is the fourth state S3. In this particular embodiment, the driver of the target vehicle starting at S0 only has two choices: slow down and turn (S1), or go straight through the intersection (S2). Mathematical equations, such as continuous state-estimates, are known to those skilled in the art and may be applied to information received from the target vehicle in order to determine the probability that the driver of the target vehicle will actually slow down and turn (S1), or go straight through the intersection (S2). Although these probabilities are continuously changing with time, the mathematical equations may provide an instantaneous estimate of the next state.

Based on target vehicle information received at the point in time when the probabilities were determined in FIG. 7A, there is a ⅔ chance that the target vehicle will go through the intersection (S2), and a ⅓ chance the vehicle will slow down and turn (S1).

According to the finite state machine model in FIG. 7A, if the target vehicle slows down to turn, there is a ¾ chance the target vehicle will proceed to the end state (S3), and ¼ chance the target vehicle will slow down to turn (remain at S1). Similarly, if the target vehicle goes through the intersection, there is a ¾ chance the target vehicle will proceed to the end state (S3), and ¼ chance the target vehicle will slow down to turn (remain at S1).

Figure 7:
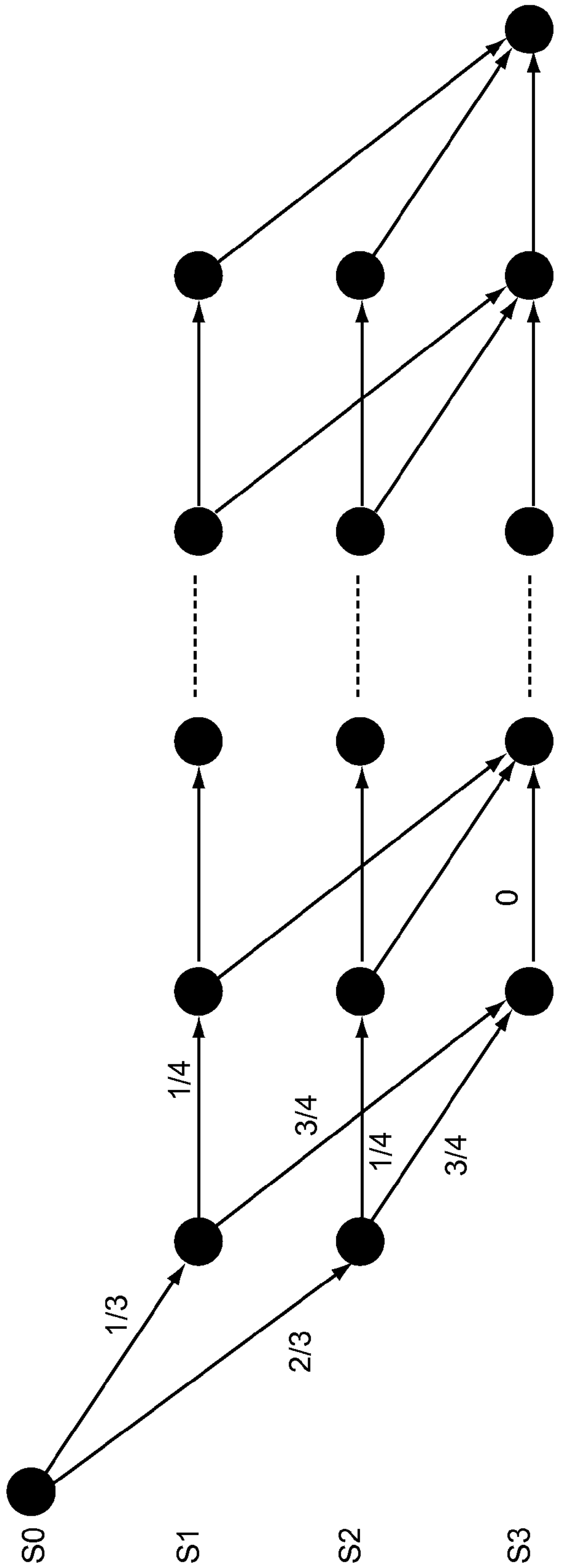
FIG. 7 is one embodiment of a Finite State Machine model.

Prediction using a finite state machine model may use a representation structure called a trellis, which has been used extensively in communication applications. A trellis may be a directed graph or tree, which starts from known initial state and ends at the designated final state. FIG. 7 shows a trellis that corresponds to the simplified finite state machine model shown in FIG. 7A. Each column in the trellis of FIG. 7 may represent an instance of time after transitions from a previous column of nodes. Thus, at the second column, there may be two possible nodes, one each for S1 and S2. S1 and S2 may represent the two possible states that can be transitioned into from the first column, and the third column may contain the possible states at the next transition, which may be S1, S2, or S3.

The probability of each state at the next transition may be represented by the fractions at the branches from each node. Each branch emanating from a node may be assigned a probability, with the total of the probabilities of the branches emanating from a node equal to one. In FIG. 7, S0 may represent an initial state of the target vehicle approaching an intersection. As can be seen in FIG. 7, there are two branches emanating from the single node at S0, with a ⅔ chance that the vehicle will reach S2, and a ⅓ chance that the vehicle will reach S1, for a total probability of one.

Once probabilities are assigned to each branch emanating from a node, it may be possible to determine the most likely end result from any state within the trellis to that result. In fact, probabilities may be determined for any possible end result from a given state. If the FSM model is more complex and transition probabilities are not directly available, further considerations may be necessary.

Figure 8:
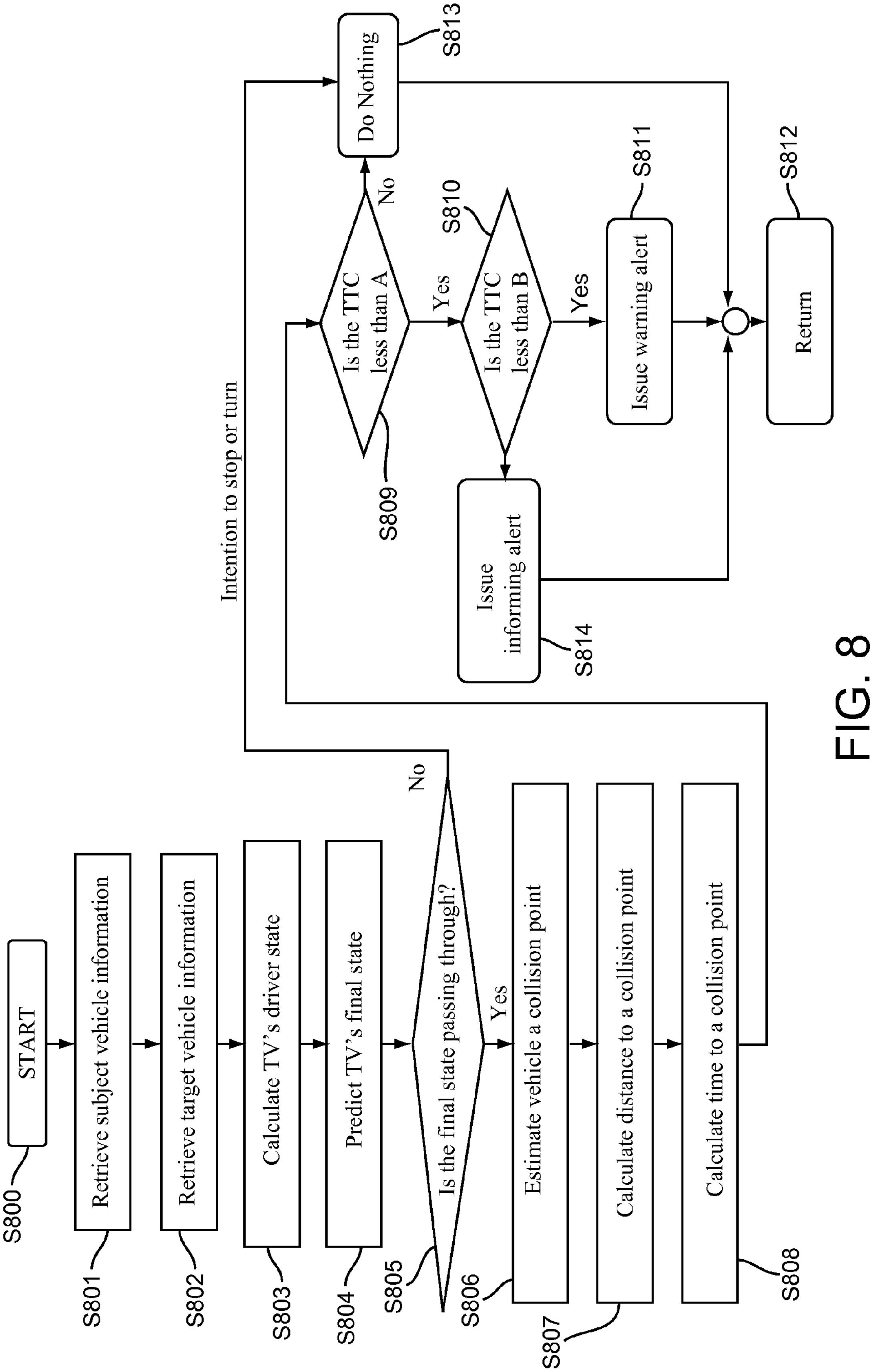
FIG. 8 is one embodiment of a method of threat calculation using the simplified Finite State Machine model.

FIG. 8 shows a sample threat calculation using the FSM model, with the calculation starting at step S800.

At step S801, ECU 120 may retrieve information such as GPS location, speed, and heading of motor vehicle 102. At step S802, ECU may retrieve similar information on target vehicle 1102.

At step S803, the driver state of target vehicle 1102 may be calculated from the information obtained at step S802. This information may be used to estimate the final state of the target vehicle 1102 using the probability trellis.

At step S804, ECU 120 may predict the final driver state of target vehicle 1102.

At step S805, ECU 120 may determine whether the estimated final state of target vehicle 1102 is passing through, stopping, or turning. If target vehicle 1102 is estimated to be stopping or turning, no information is provided to collision warning system 100 of motor vehicle 102 as shown by step S813, but ECU 120 may continue to estimate final states of target vehicle 102 using continually updated information as shown by the return to start S800 at step S812.

If, at step S805, ECU 120 of motor vehicle 102 estimates the final state as passing through the intersection, ECU 120 of motor vehicle 102 may estimate a vehicle collision point at step S806, followed by calculating distance and time to the collision point in step S807 and step S808, respectively.

In step S809, ECU 120 of motor vehicle 102 may compare the calculated time to collision to a quantity A. If the calculated time to collision is greater than quantity A, no information may be provided to collision warning system 100 of motor vehicle 102. If the calculated time to collision is less than quantity A, ECU 120 of motor vehicle 102 may proceed to step S810.

At step S810, ECU 120 of motor vehicle 102 may compare the calculated time to collision to a quantity B, which is less than quantity A of step S809. If the calculated time to collision is greater than quantity B, ECU 120 of motor vehicle 102 presents an informing alert to collision warning system 100 at step S814 showing the estimated paths of motor vehicle 102 and target vehicle 1102. If the calculated time to collision is less than quantity B, ECU 120 of motor vehicle 102 may present a collision warning at step S811. Regardless of whether an informing alert at step S814 or a collision warning alert at step S811 is presented to collision warning system 100 of motor vehicle 102, ECU 120 of motor vehicle 102 may go to step S812, which may start the process of monitoring the target vehicle's intentions anew at step S800.

Initial probability assignments for a FSM may be accomplished by giving each state trajectory starting at an initial state and ending at a final state equal weight. After the initial assignment of probabilities, the state transition probabilities may be dynamically updated depending on the measurements on target vehicles.

Dynamic probability updates may be assigned to binary information (e.g., brake applied, turn signal on, etc.) or they may be conditioned to change according to thresholds on continuous states (e.g., deceleration greater than a given value). The probabilities of each path to a given final state may be totaled to determine the probability of going from the present state to each final state.

Figure 9:
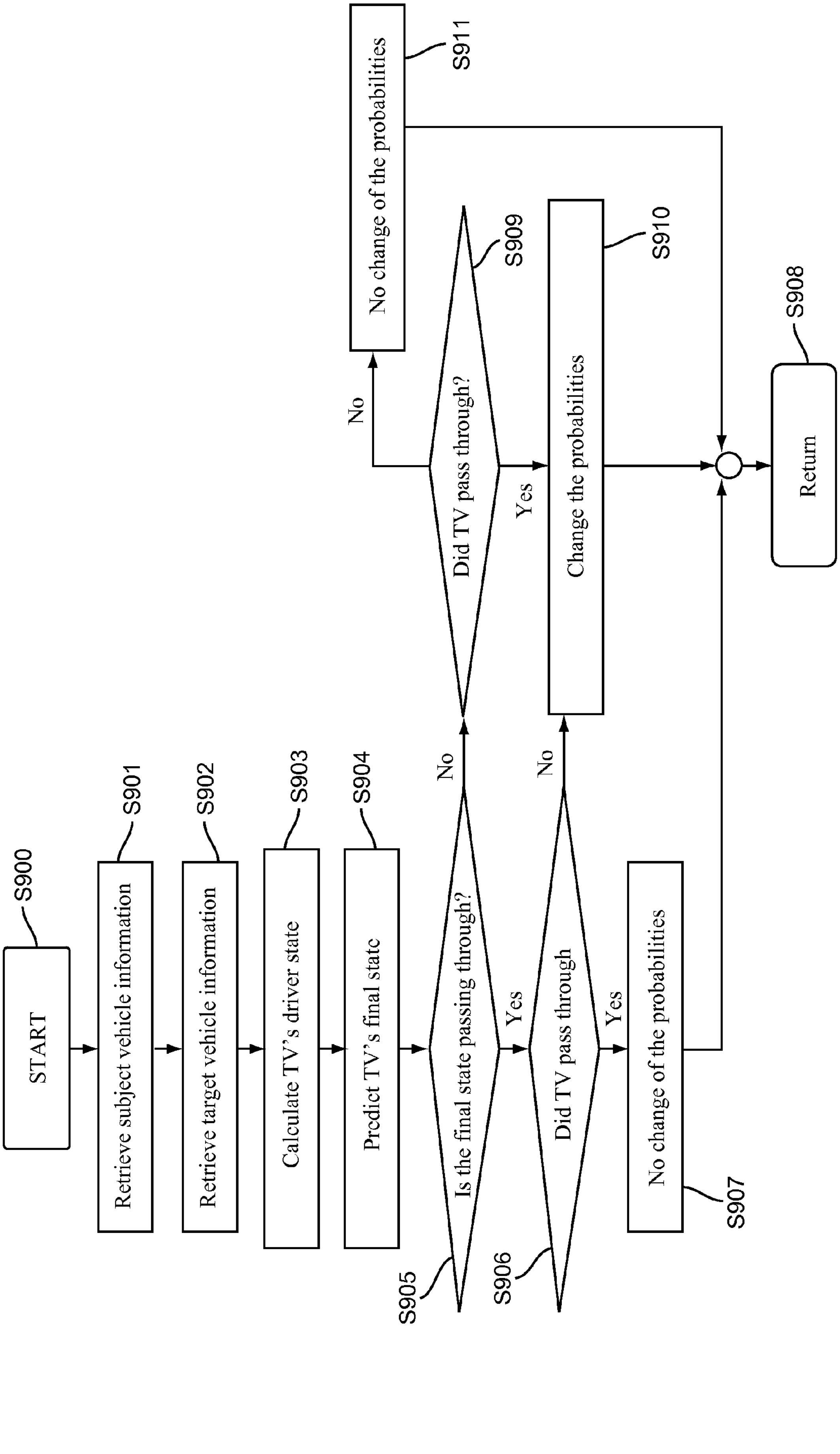
FIG. 9 is one embodiment of a method of updating dynamic probabilities.

FIG. 9 shows a simple example of updating probabilities using historical data. Steps S900 to S905 may be exactly the same as, or similar to, steps S800 to S805 shown in FIG. 8 and explained above.

If, at step S905, ECU 120 of motor vehicle 102 estimates the final state to be target vehicle 1102 passing through an intersection, step S906 may determine if target vehicle 1102 actually does pass through the intersection. If target vehicle 1102, consistent with the estimate of ECU 120 of motor vehicle 102, does pass through the intersection, the next step S907 may be no change in probabilities, and ECU 120 of motor vehicle 102 may proceed to step S908. If the estimate of ECU 120 of motor vehicle 102 that target vehicle 1102 would pass through the intersection proves incorrect, ECU 120 of motor vehicle 102 may proceed to step S910 to correct the probabilities of a transition from the initial state to the final state, and then to step S908. Step S908 may be a return of ECU 120 of motor vehicle 102 step S900 and to estimating actions of a target vehicle and determining whether the estimate is correct.

If, at step S905, ECU 120 of motor vehicle 102 estimates the final state to be target vehicle 1102 not passing through the intersection, ECU 120 of motor vehicle 102 may proceed to step S909, which may determine if target vehicle 1102 passes through the intersection. If, consistent with the estimate of ECU 120 of motor vehicle 102, target vehicle 1102 does not pass through the intersection, there may be no change in probabilities at step S911. If, on the other hand, target vehicle 1102 passes through the intersection, the probabilities of a transition from the initial to the final states may be adjusted in step S910. In either case, ECU 120 of motor vehicle 102 may proceed to step S908, a return of ECU 120 of motor vehicle 102 to estimating actions of a target vehicle and determining whether the estimate is correct.

Example 1

Figure 10:
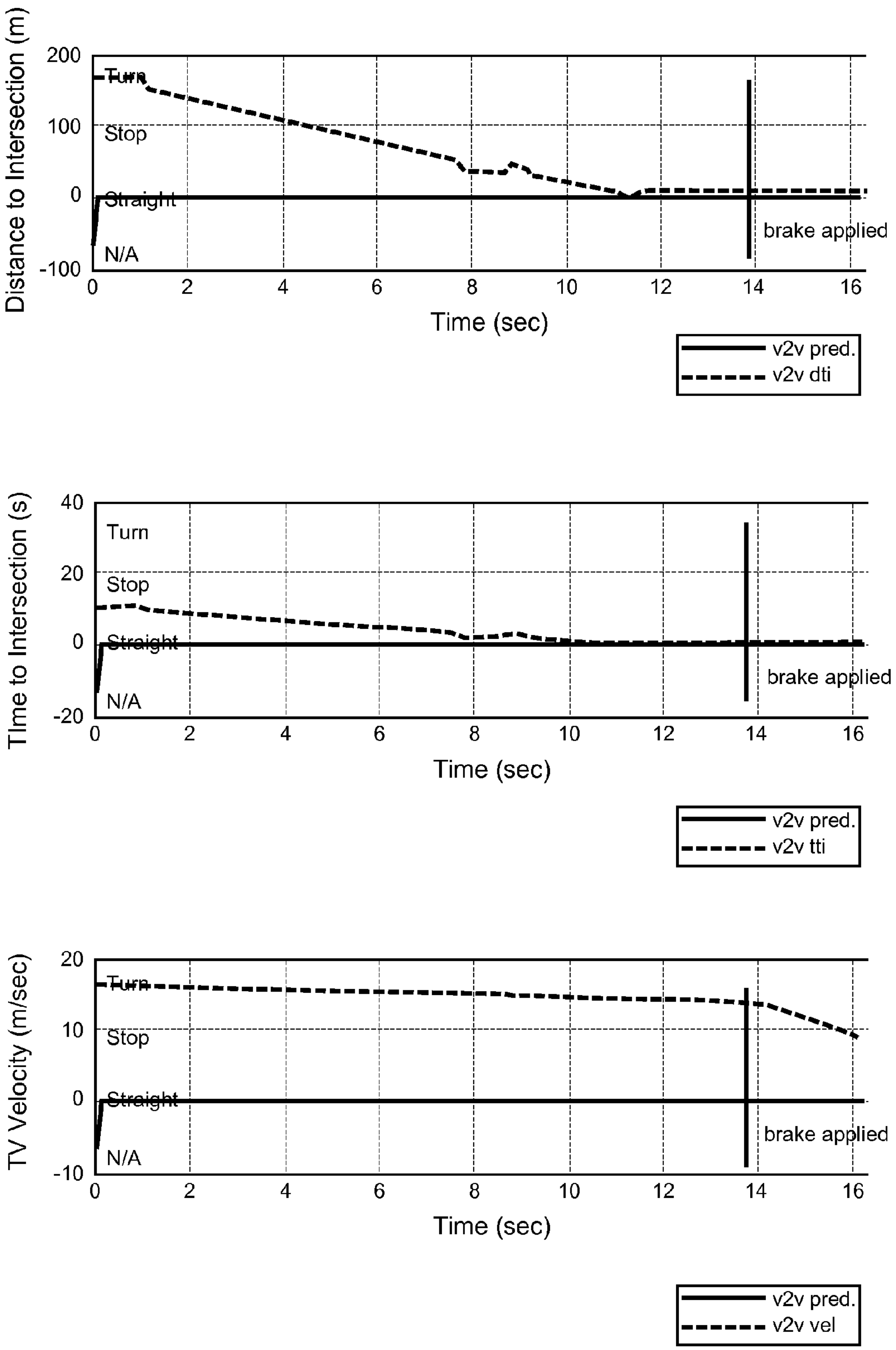
FIG. 10 is a set of diagrams for one embodiment of a target vehicle going straight through an intersection.

FIG. 10 shows continuous states of target vehicle 1102, as generated by the vehicle tracking system of motor vehicle 102, plotted versus time, as well as the predicted state for target vehicle 1102 going straight through an intersection at 35 mph. The horizontal axes of the three parallel diagrams show time. The vertical axes represent distance to intersection, time to intersection, and velocity of target vehicle 1102 from top to bottom diagram, with each of those quantities shown by a dashed line. Each vertical axis also represents an estimated vehicle state of target vehicle 1102, which is shown by a solid line.

The driver of target vehicle 1102 applies the brakes just before 14 seconds, after which target vehicle 1102 slows slightly. However, the estimated vehicle state of "going straight through" is maintained throughout the observed period shown in FIG. 10.

Example 2

Figure 11:
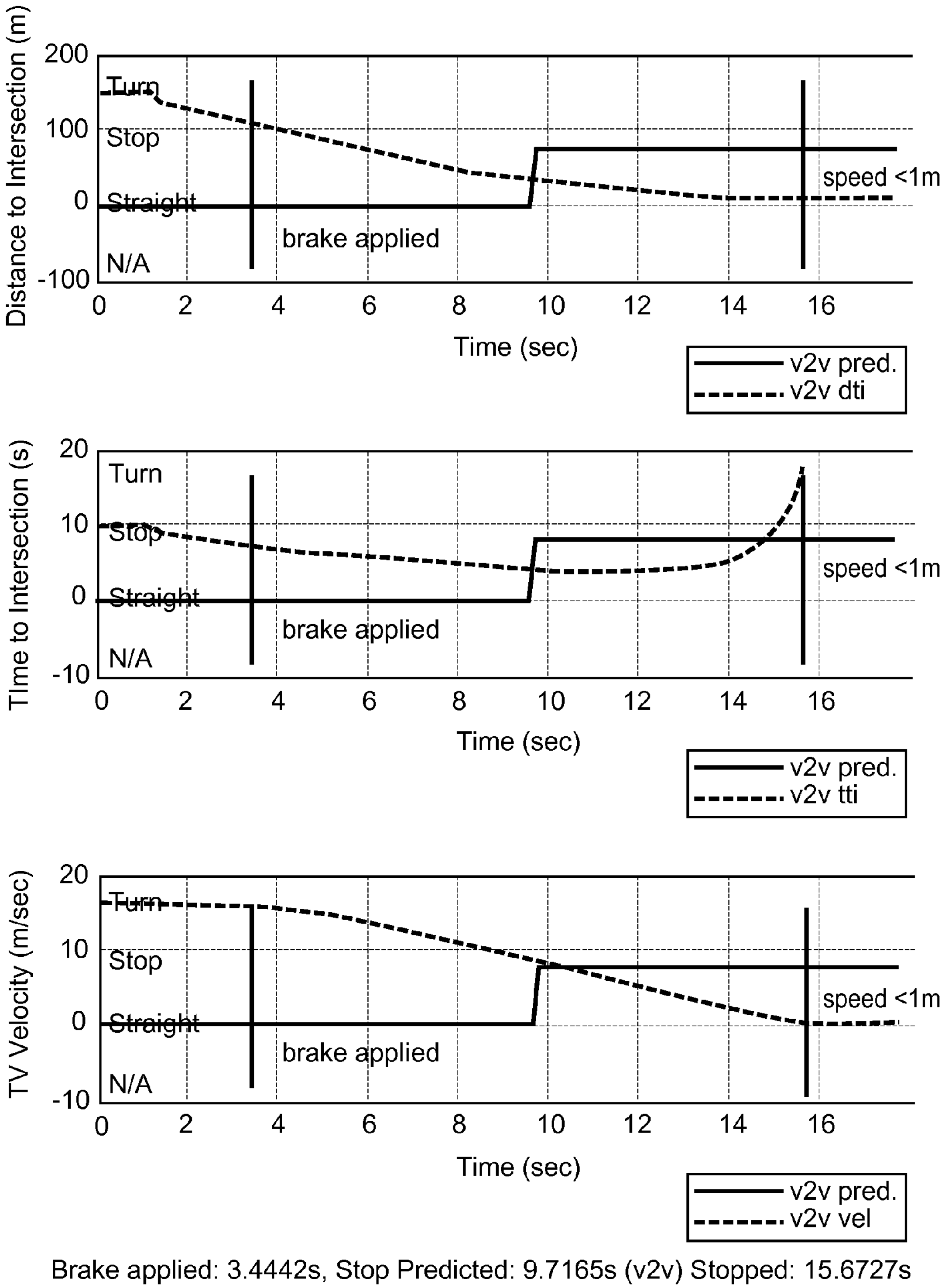
FIG. 11 is a set of diagrams for one embodiment of a target vehicle slowing down and stopping before entering an intersection.

FIG. 11 shows diagrams similar to those of Example 1 above of a target vehicle slowing down and stopping before entering the intersection. ECU 120 of motor vehicle 102 originally generates a "going straight through" estimate.

At approximately 3.5 seconds, "brake applied" information is obtained via the DSRC (or other vehicle communication) network from target vehicle 1102. At roughly 9.5 seconds (about 6 seconds short of target vehicle 302 stopping), ECU 120 of motor vehicle 102 estimates using the appropriate algorithm that target vehicle 1102 will stop at the intersection.

Example 3

Figure 12:
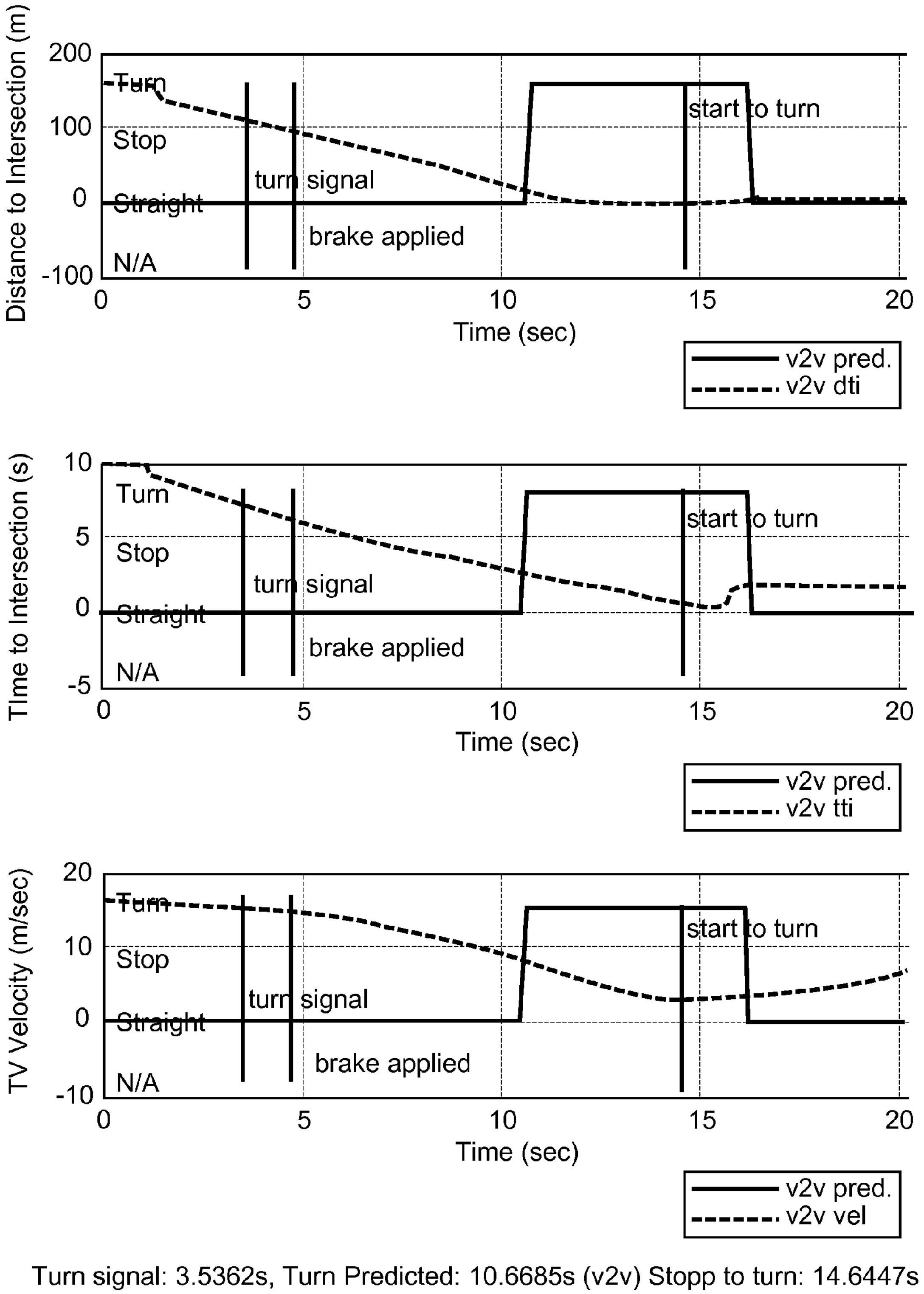
FIG. 12 is a set of diagrams for one embodiment of a target vehicle approaching an intersection, slowing down, and turning right.

FIG. 12 shows another set of diagrams, this set plotting continuous states and estimated vehicle states of target vehicle 1102 as it approaches an intersection, slows down, and turns right. As with the previous examples, the initial estimate is that target vehicle 1102 will go straight through the intersection.

At approximately 3.5 seconds, the driver of target vehicle 1102 activates the turn signal, and then applies the brakes just short of the 5 second mark. ECU 120 of motor vehicle 102 estimates at approximately 10.7 seconds that target vehicle 1102 will turn. Approximately 4 seconds later, target vehicle 1102 starts to turn.

Example 4

Figure 13:
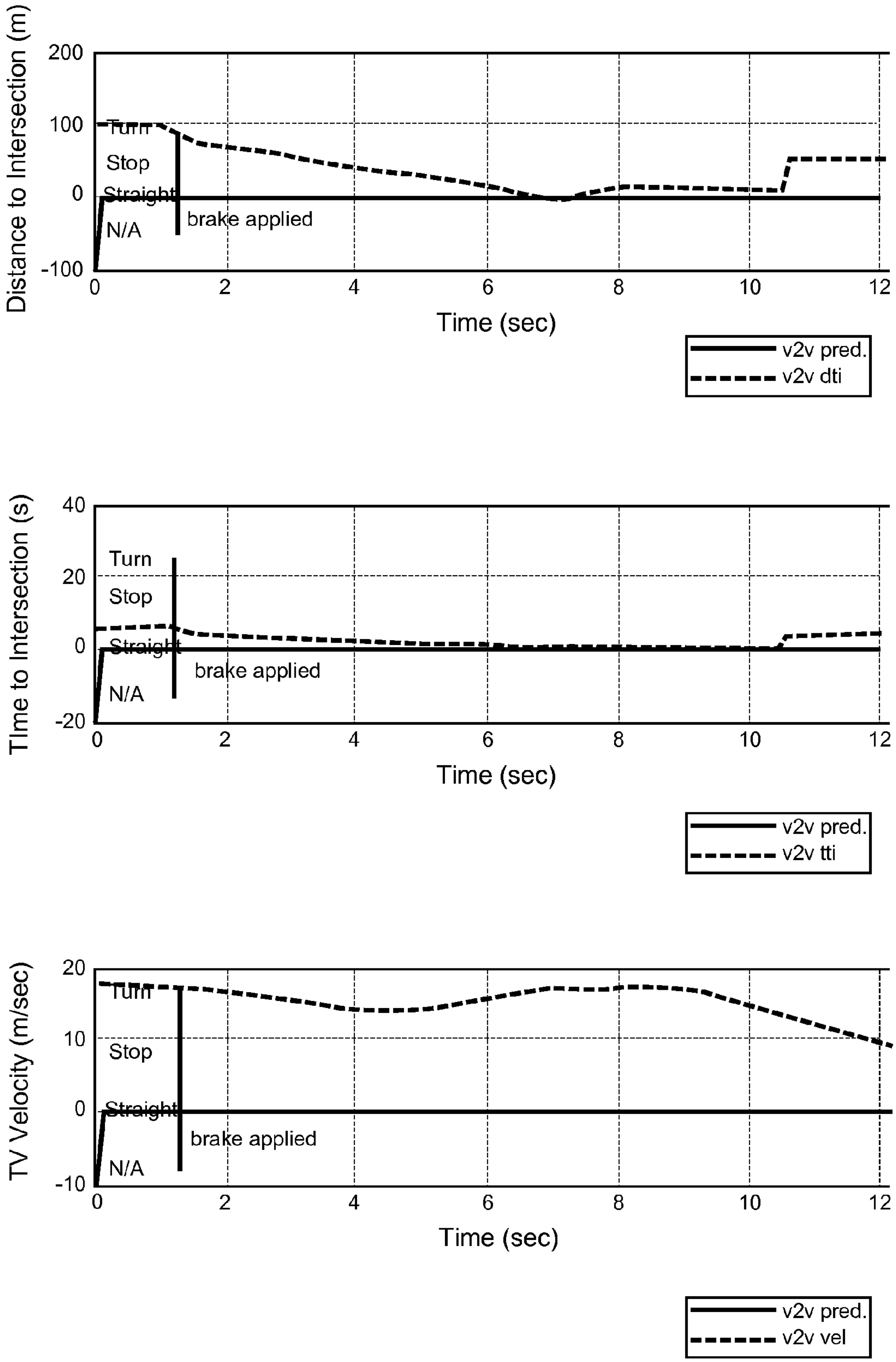
FIG. 13 is a set of diagrams for one embodiment of a target vehicle slowing down and accelerating back to go through an intersection.

FIG. 13 shows another set of diagrams, this set plotting continuous states and estimated vehicle states of target vehicle 1102 as it slows down and accelerates back to go through an intersection. This example may demonstrate "yellow light" behavior in which the driver of target vehicle 1102 taps the brakes slightly as he sees the yellow light, but then decides to go through and accelerates. The estimate begins at and stays at "going straight through" the intersection.

Example 5

Figure 14:
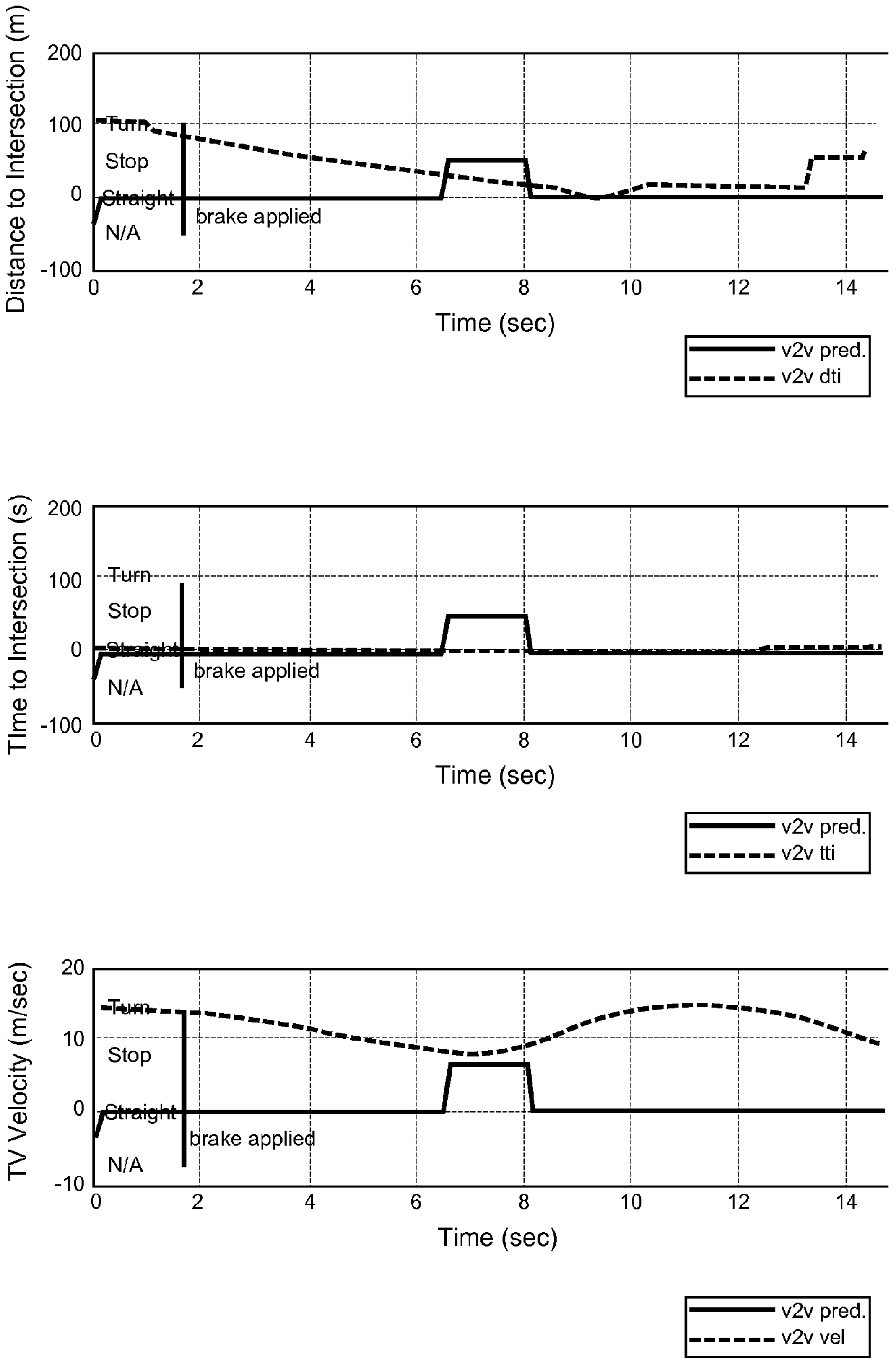
FIG. 14 is a set of diagrams for one embodiment of a target vehicle slowing down significantly before the driver of the target vehicle accelerates and goes through an intersection.

FIG. 14 shows another set of diagrams, this set plotting continuous states and estimated vehicle states of target vehicle 1102 as it slows down significantly before the driver of target vehicle 1102 accelerates and goes straight through the intersection. This example, like Example 4, may show "yellow light" behavior, but with greater deceleration than was detected in Example 4.

As shown in FIG. 14, the driver of target vehicle 1102 applies the brake just short of 2 seconds. As target vehicle 1102 continues to decelerate, estimated driver intention goes from "going straight through" the intersection to "stopping" at around 6.5 seconds. The driver of target vehicle 1102 then accelerates and the estimated driver intention returns to "going straight through" at about 8 seconds.

Information about target vehicles may be communicated to subject vehicles directly from the target vehicle (vehicle-to-vehicle or V2V), through a vehicle to infrastructure (V2I) channel, or through a combination of V2V and V2I channels. There may be a dedicated communication unit associated with the intersection that acquires information about all vehicles within a given range of the intersection, and uses accumulated historic data to adjust state to state probabilities in a trellis.

The busiest and/or most dangerous intersections may be more likely to have dedicated communication units. The dedicated communications units may have one or more databases that are constantly updated by data collected from and concerning vehicles approaching the intersection.

Dedicated communications units at intersections may accumulate data not only about the vehicles approaching the intersection, but also concerning physical conditions at the intersection such as fog, rainfall, or water on the road surface. Such conditions may not only affect a vehicle's ability to stop, but also behavior of the driver. A driver at exactly the same speed and distance from an intersection may be more likely to decide to go through an intersection at a yellow light in wet conditions than in dry conditions, feeling that the wet surface will make it more difficult to stop the vehicle before reaching the intersection.

A driver may also be more likely to go through a yellow light if another vehicle is following too closely, and the driver determines the following car would be unable to stop in time. Such behavior may also be affected by road conditions.

The dedicated communication unit for an intersection may also collect information relating to driver behavior according to time of day and/or day of the week. An intersection may be located near a large industrial complex or office complex. Such a location may lead to a very different pattern of traffic at times when most people are going to or returning from work.

The make, model, and color of a car may also provide an indication of driver behavior. If V2I or V2V communication provides such information on target vehicle 1102, the dedicated communication unit—or ECU 120 located on motor vehicle 102—may find that drivers of red sports cars are more likely to continue through a yellow light, while drivers of white luxury cars are more likely to stop.

Target vehicle 1102 may transmit information including a unique identifier. Thus, a dedicated communication unit may collect tendencies for the driver(s) of target vehicle 1102 at that intersection. A driver whose home or work is near a particular intersection may always, or virtually always, take the same action at the intersection.

Rather than relying on V2I information, ECU 120 of motor vehicle 102 may have a database with characteristics of intersections. E.g., information such as whether the information has a stop sign, flashing yellow light, stop light, stop light with turn signals, etc. may be included in the database, as well as the number of traffic lanes for each of the intersecting roads and the existence of turn lanes. The database may be updated by other vehicles in the vicinity once the subject vehicle enters an area. The database may also include historic information about intersections obtained from other vehicles and/or V2I sources.

Regardless of whether the information concerning the intersection is obtained via V2V, V2I, or a combination of the two, ECU 120 of motor vehicle 102 may use the information obtained in the algorithm represented by the trellis to obtain a prediction of the action of the driver of target vehicle 1102.

Figure 15:
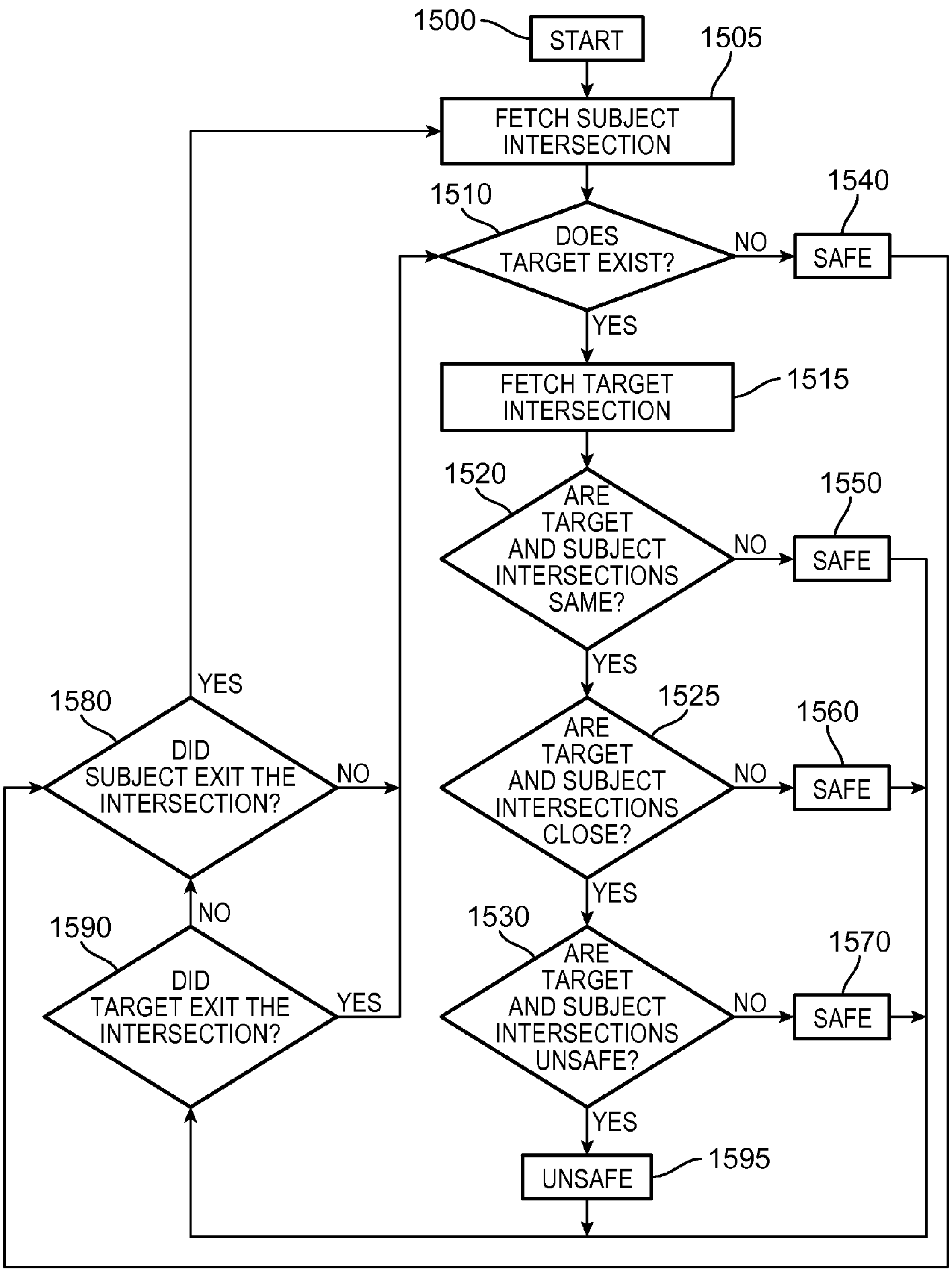
FIG. 15 is one embodiment of a method for estimating unsafe conditions.

In some embodiments, the algorithms and prediction models may take into account information relating to both the target and subject vehicles. For example, FIG. 15 shows one embodiment of a method for estimating unsafe conditions. In one embodiment, at least two vehicles may exchange information in order to determine an unsafe condition. In other embodiments, more than two vehicles may exchange information in order to determine whether an unsafe condition may be developing. In some embodiments, each vehicle may operate its own intention estimator in order to generate a prediction of the intentions of the target vehicle(s) and/or subject vehicle. In some embodiments, these predictions are combined with data from a map of the environment. In some embodiments, the predictions and map data are interpreted by a safety check module, which makes an estimate on the safety of the situation. In some embodiments, the safety check module may be the ECU. In some embodiments, the safety check module may reside partially within the ECU, or be separate and independent from the ECU. In some embodiments, the ECU may be a safety estimator. In some embodiments, the method shown in FIG. 15 runs continuously. In some embodiments, the process shown in FIG. 15 may be performed by a microprocessor having a central processing unit. The microprocessor may have electronic memory, such as RAM and/or ROM, as well as software. In some embodiments, the ECU may perform the process shown in FIG. 15. In some embodiments, the ECU may be a microprocessor.

In step 1505, the safety estimator may receive data relating to the geographic intersection that the subject vehicle is approaching. In some embodiments, the safety estimator may receive the node identification of the intersection that the subject vehicle is approaching in step 1505.

In step 1510, the safety estimator may determine whether there is a target vehicle (vehicle other than the subject vehicle) in the vicinity of the subject vehicle. In some embodiments, the safety estimator may search for a target vehicle that is within 100 feet of the subject vehicle. In some embodiments, the safety estimator may search for a target vehicle that is within 1000 feet of the target vehicle. In some embodiments, the safety estimator may search for a target vehicle that is less than or more than 1000 feet from the subject vehicle. In some embodiments, the safety estimator may search for a target vehicle that is within a predetermined range of the subject vehicle. If no target vehicle is in the vicinity of the subject vehicle, the safety estimator may proceed to step 1540 and determine that the subject vehicle is safe, and then proceed to step 1580. If a target vehicle is within the vicinity of the subject vehicle, the safety estimator may proceed to step 1515.

In step 1515, the safety estimator may receive information relating to the geographic intersection that the target vehicle is approaching. In some embodiments, the safety estimator may receive the node identification of the intersection that the target vehicle is approaching in step 1515.

In step 1520, the safety estimator may compare the node identification that the subject vehicle is approaching in step 1505 with the node identification that the target vehicle is approaching in step 1515. If the safety estimator determines that the subject vehicle and the target vehicle are not approaching the same intersection, the safety estimator may proceed to step 1550 and determine that the condition is safe, and then may proceed to step 1580. If the safety estimator determines that the subject vehicle and the target vehicle are approaching the same intersection, the safety estimator may proceed to step 1525.

In step 1525, the safety estimator may estimate the time that the subject vehicle will arrive at the intersection and the time that the target vehicle will arrive at the intersection. In some embodiments, the velocity of the vehicle and distance to the intersection are used to determine the time each vehicle will arrive at the intersection. Some embodiments may consider the following information when determining the time each vehicle will arrive at the intersection: vehicle position, vehicle speed, vehicle heading, vehicle acceleration, turning information (blinker state), yaw rate, steering wheel angle, distance between two vehicles, brake status, brake history, traveling lane information (such as dedicated right turn lane), distance to intersection as well as other types of information.

If the arrival times of the subject vehicle and the target vehicle are greater than a predetermined threshold, then the safety estimator may proceed to step 1560 and determine the condition is safe, and then proceed to step 1580. If the arrival times of the subject vehicle and the target vehicle are less than a predetermined threshold, then the safety estimator may proceed to step 1530. In some embodiments, the predetermined threshold is five seconds. In other embodiments, the predetermined threshold may be more or less than five seconds.

In step 1530, the intention estimator may estimate the intentions of the driver of the target vehicle and the driver of the subject vehicle. In some embodiments, the intention estimator may approach direction and speed of the target and subject vehicle. In some embodiments, the intention estimator may estimate the intentions of the subject and target vehicle as shown in FIGS. 6-9. In some embodiments, the intention estimator may compare the estimated intentions of the subject and target vehicle with a table that is stored in electronic memory. In some embodiments, the intention estimator may access the table shown in FIG. 16 to determine if an unsafe condition exists. In the table shown in FIG. 16, TV (along the top x-axis) represents the target vehicle and HV (along the left y-axis) represents the subject vehicle. If the look-up table indicates that the vehicles will cross paths, then there may be an unsafe condition. In some embodiments, the intention estimator may access the table shown in FIG. 17 to determine if an unsafe condition exists. The intention estimator may enter the table in FIG. 17 on the left hand side of the table. If the conditions are such that the table indicates a "U", then conditions are unsafe.

If the intention estimator determines the condition is safe, the intention estimator proceeds to step 1570, and then to step 1580. If the intention estimator determines the conditions are unsafe, the intention estimator proceeds to step 1595.

In step 1595, the intention estimator issues a warning to the driver of the subject vehicle. In one embodiment in step 1595, the intention estimator issues a warning and indicates the direction from which the target vehicle is approaching.

In step 1590, the intention estimator determines whether the target vehicle has exited the intersection. If the target vehicle has exited the intersection, the intention estimator proceeds to step 1510. If the target vehicle has not exited the intersection, the intention estimator proceeds to step 1580 and determines if the subject vehicle has exited the intersection. If the subject vehicle has exited the intersection, the intention estimator proceeds to step 1505. If the subject vehicle has not exited the intersection, the intention estimator proceeds to step 1510.

While various embodiments of the embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Certain aspects of each of the embodiments may be combined with other aspects of different embodiments described herein. Also, various modifications and changes may be made within the scope of the attached claims.

We claim:

1. A method of operating a collision warning system in a subject vehicle, comprising the steps of:

receiving, by an electronic control unit (ECU), information related to a target vehicle approaching an intersection, wherein the information related to the target vehicle has been transmitted by the target vehicle;

determining, based on the received information related to the target vehicle, a distance of the target vehicle from the intersection, a current speed of the target vehicle, and an acceleration of the target vehicle by the ECU;

calculating, by the ECU, an initial state of the target vehicle as the target vehicle approaches the intersection based on the distance of the target vehicle from the intersection;

calculating, by the ECU, a plurality of possible end states of the target vehicle based on the initial state, the distance of the target vehicle from the intersection, the current speed of the target vehicle, and the acceleration of the target vehicle;

predicting, by the ECU, a final end state of the plurality of possible end states based on the step of calculating the plurality of possible end states;

wherein the final end state is associated with a predicted target vehicle action selected from a plurality of vehicle actions, the plurality of vehicle actions comprising going straight through the intersection, stopping at the intersection, and making a turn at the intersection; and initiating a providing of an alert through the collision warning system based on the predicted target vehicle action.

2. The method according to claim 1, wherein the step of calculating the plurality of possible end states is further based on a time to the intersection for the target vehicle.

3. The method according to claim 2, further comprising:

determining a state of a turn signal, yaw rate, steering wheel angle, brake status, or a combination thereof of the target vehicle based on the received information related to the target vehicle; and wherein the step of calculating the plurality of possible end states is further based on the determined state of the turn signal, yaw rate, steering wheel angle, brake status, or a combination thereof.

4. The method according to claim 1, wherein the step of calculating the plurality of possible end states further provides probabilities for each of the plurality of possible end states.

5. The method according to claim 4, wherein the step of predicting the final end state is further based on the probabilities for each of the plurality of possible end states.

6. The method according to claim 5, wherein an end state of the plurality of possible end states with the highest probability is selected as the final end state.

7. The method according to claim 5, wherein the probabilities for each of the plurality of possible end states are dynamically updated.

8. The method according to claim 1, wherein the alert is based on the predicted target vehicle action.

9. A method of operating a collision warning system in a subject vehicle, comprising the steps of:

receiving, by an electronic control unit (ECU), information related to a target vehicle approaching an intersection, wherein the information related to the target vehicle has been transmitted by the target vehicle;

determining, based on the received information related to the target vehicle, a distance of the target vehicle from the intersection, a current speed of the target vehicle, and an acceleration of the target vehicle by the ECU;

calculating, by the ECU, an initial state of the target vehicle as the target vehicle approaches the intersection based on the distance of the target vehicle from the intersection;

calculating, by the ECU, a plurality of possible end states of the target vehicle based on the initial state, the distance of the target vehicle from the intersection, the current speed of the target vehicle, and the acceleration of the target vehicle;

predicting, by the ECU, a final end state of the plurality of possible end states based on the step of calculating the plurality of possible end states;

wherein the final end state is associated with a predicted target vehicle action selected from a plurality of vehicle actions, the plurality of vehicle actions comprising going straight through the intersection, stopping at the intersection, and making a turn at the intersection;

calculating, by the ECU, a time to an estimated collision point based on the predicted target vehicle action; and selecting, by the ECU, an alert from a plurality of alerts based on the time to the estimated collision point, each of the plurality of alerts indicating the estimated vehicle collision point.

10. The method according to claim 9, wherein the step of calculating the plurality of possible end states is further based on a time to the intersection for the target vehicle.

11. The method according to claim 10, further comprising:

determining, by the ECU, a state of a turn signal, yaw rate, steering wheel angle, brake status, or a combination thereof of the target vehicle based on the received information related to the target vehicle;

wherein the step of calculating the plurality of possible end states is further based on the determined state of the turn signal, yaw rate, steering wheel angle, brake status, or a combination thereof.

12. The method according to claim 9, wherein the step of calculating the plurality of possible end states further provides probabilities for each of the plurality of possible end states.

13. The method according to claim 12, wherein the step of predicting the final end state is further based on the probabilities for each of the plurality of possible end states.

14. The method according to claim 13, wherein an end state of the plurality of possible end states with the highest probability is selected as the final end state.

15. The method according to claim 13, wherein the probabilities for each of the plurality of possible end states are dynamically updated.

16. A method of operating a collision warning system in a subject vehicle, comprising the steps of:

processing, by an electronic control unit (ECU), of information received from a target vehicle to:

calculate an initial state of the target vehicle as the target vehicle approaches an intersection;

calculate a plurality of possible end states of the target vehicle based on the initial state and based on a distance of the target vehicle from the intersection, a current speed of the target vehicle, and an acceleration of the target vehicle;

predict a final end state of the plurality of possible end states based on the processing to calculate the plurality of possible end states; and wherein the final end state is associated with a predicted target vehicle action selected from a plurality of vehicle actions, the plurality of vehicle actions comprising going straight through the intersection, stopping at the intersection, and making a turn at the intersection;

initiating a providing of an alert through the collision warning system based on the predicted target vehicle action;

comparing, by the ECU, the predicted target vehicle action to the actual actions of the target vehicle; and updating, by the ECU, probabilities between states of the target vehicle based on the step of comparing of the predicted target vehicle action to the actual actions of the target vehicle.

17. The method according to claim 16, wherein the processing to calculate the plurality of possible end states is further based on a time to the intersection for the target vehicle.

18. The method according to claim 16, wherein the processing to calculate the plurality of possible end states further provides probabilities for each of the plurality of possible end states.

19. The method according to claim 18, wherein the processing to predict the final end state is further based on the probabilities for each of the plurality of possible end states.

20. The method according to claim 19, wherein an end state of the plurality of possible end states with the highest probability is selected as the final end state.

21. A method of operating a collision warning system in a subject vehicle, comprising the steps:

receiving, by an electronic control unit (ECU), information related to the subject vehicle approaching an intersection;

receiving, by the ECU, information related to a target vehicle approaching the intersection, wherein the information related to the target vehicle has been transmitted by the target vehicle;

determining, based on the received information related to the subject vehicle, a distance of the subject vehicle from the intersection, a current speed of the subject vehicle, and an acceleration of the subject vehicle by the ECU;

determining, based on the received information related to the target vehicle, a distance of the target vehicle from the intersection, a current speed of the target vehicle, and an acceleration of the target vehicle by the ECU;

calculating, by the ECU, an initial state of the target vehicle as the target vehicle approaches the intersection based on the distance of the target vehicle from the intersection;

calculating, by the ECU, a plurality of possible end states of the target vehicle based on the initial state of the target vehicle, the distance of the target vehicle from the intersection, the current speed of the target vehicle, and the acceleration of the target vehicle;

predicting, by the ECU, a final end state of the plurality of possible end states of the target vehicle based on the step of calculating the plurality of possible end states of the target vehicle;

wherein the final end state is associated with a predicted target vehicle action selected from a plurality of vehicle actions, the plurality of vehicle actions comprising going straight through the intersection, stopping at the intersection, and making a turn at the intersection;

predicting, by the ECU, a subject vehicle action of the subject vehicle as the subject vehicle approaches the intersection based on the distance of the subject vehicle from the intersection, current speed of the subject vehicle, and acceleration of the subject vehicle, wherein the subject vehicle action is selected from the plurality of vehicle actions; and initiating a providing of an alert through the collision warning system based on the predicted subject vehicle action and the predicted target vehicle action.

22. The method according to claim 21, wherein the step of calculating the plurality of possible end states of the target vehicle is further based on a time to the intersection for the subject vehicle, and wherein the step of calculating the plurality of possible end states of the target vehicle is further based on a time to the intersection for the target vehicle.

23. The method according to claim 21, further comprising:

determining a state of a turn signal, yaw rate, steering wheel angle, brake status, or a combination thereof of the target vehicle based on the received information related to the target vehicle; and wherein the step of calculating the plurality of possible end states of the target vehicle is further based on the state of the turn signal, yaw rate, steering wheel angle, brake status, or a combination thereof.

24. The method according to claim 21, wherein the step of calculating the plurality of possible end states of the target vehicle further provides probabilities for each of the plurality of possible end states of the target vehicle, and wherein the step of predicting, by the ECU, of the predicted subject vehicle action provides probabilities for each of a plurality of possible end states of the subject vehicle.

25. The method according to claim 24, wherein the step of predicting the final end state of the plurality of possible end states of the target vehicle is further based on the probabilities for each of the plurality of possible end states of the target vehicle, and wherein the predicted subject vehicle action is determined by using the probabilities for each of the plurality of possible end states of the subject vehicle.

26. The method according to claim 25, wherein an end state of the plurality of possible end states of the target vehicle with the highest probability is selected as the final end state of the target vehicle, and wherein an end state of the plurality of possible end states of the subject vehicle with the highest probability is selected as a final end state of the subject vehicle.

27. The method according to claim 25, wherein the probabilities for each of the plurality of possible end states of the target vehicle are dynamically updated, and wherein the probabilities for each of the plurality of possible end states of the subject vehicle are dynamically updated.

28. The method according to claim 21, wherein the alert is based on the predicted target vehicle action and the predicted subject vehicle action.

29. A method of operating a collision warning system in a subject vehicle, comprising the steps:

receiving, by an electronic control unit (ECU), information related to the subject vehicle approaching an intersection;

receiving, by the ECU, information related to a target vehicle approaching the intersection, wherein the information related to the target vehicle has been transmitted by the target vehicle;

determining, based on the received information related to the subject vehicle, a distance of the subject vehicle from the intersection, a current speed of the subject vehicle, and an acceleration of the subject vehicle by the ECU;

determining, based on the received information related to the target vehicle, a distance of the target vehicle from the intersection, a current speed of the target vehicle, and an acceleration of the target vehicle by the ECU;

calculating, by the ECU, an initial state of the target vehicle as the target vehicle approaches the intersection based on the distance of the target vehicle from the intersection;

calculating, by the ECU, a plurality of possible end states of the target vehicle based on the initial state of the target vehicle, the distance of the target vehicle from the intersection, the current speed of the target vehicle, and the acceleration of the target vehicle;

predicting, by the ECU, a final end state of the plurality of possible end states the target vehicle based on the step of calculating the plurality of possible end states of the target vehicle;

wherein the final end state of the plurality of possible end states of the target vehicle is associated with a predicted target vehicle action selected from a plurality of vehicle actions, the plurality of vehicle actions comprising going straight through the intersection, stopping at the intersection, and making a turn at the intersection;

predicting, by the ECU, a subject vehicle action of the subject vehicle as the subject vehicle approaches the intersection based on the distance of the subject vehicle from the intersection, current speed of the subject vehicle, and acceleration of the subject vehicle, wherein the subject vehicle action is selected from the plurality of vehicle actions;

calculating, by the ECU, a time to an estimated collision point based on the predicted target vehicle action and the predicted subject vehicle action; and selecting, by the ECU, an alert from a plurality of alerts based on the time to the estimated collision point, each of the plurality of alerts indicating the estimated vehicle collision point.

30. The method according to claim 29, wherein the step of calculating the plurality of possible end states of the target vehicle is further based on a time to the intersection for the target vehicle and the predicted subject vehicle action is further based on a time to the intersection for the subject vehicle.

31. The method according to claim 30, further comprising:

determining a state of a turn signal, yaw rate, steering wheel angle, brake status, or a combination thereof of the target vehicle based on the received information related to the target vehicle;

wherein the step of calculating the plurality of possible end states of the target vehicle is further based on the state of the turn signal, yaw rate, steering wheel angle, brake status, or a combination thereof of the target vehicle;

determining a state of a turn signal, yaw rate, steering wheel angle, brake status, or a combination thereof of the subject vehicle based on the received information related to the subject vehicle; and wherein the predicted subject vehicle action is further based on the state of the turn signal, yaw rate, steering wheel angle, brake status, or a combination thereof of the subject vehicle.

32. The method according to claim 29, wherein the step of calculating the plurality of possible end states of the target vehicle includes providing probabilities for each of the plurality of possible end states of the target vehicle, and wherein the step of predicting, by the ECU, the subject vehicle action includes providing probabilities for each of a plurality of possible end states of the subject vehicle.

33. The method according to claim 32, wherein the step of predicting the final end state of the plurality of possible end states of the target vehicle is further based on the probabilities for each of the plurality of possible end states of the target vehicle, and wherein the predicted subject vehicle action is further based on the probabilities for each of the plurality of possible end states of the subject vehicle.

34. The method according to claim 33, wherein an end state of the plurality of possible end states of the target vehicle with the highest probability is selected as the final end state of the target vehicle, and wherein an end state of the plurality of possible end states of the subject vehicle with the highest probability is selected as a final end state of the subject vehicle.

35. The method according to claim 33, wherein the probabilities for each of the plurality of possible end states of the subject vehicle are dynamically updated.

36. A method of operating a collision warning system in a subject vehicle, comprising the steps:

processing, by an electronic control unit (ECU), of information received from a subject vehicle to:

calculate an initial state of the subject vehicle as the subject vehicle approaches an intersection;

calculate a plurality of possible end states of the subject vehicle based on the initial state and based on a distance of the subject vehicle from the intersection, a current speed of the subject vehicle, and an acceleration of the subject vehicle;

predict a final end state of the plurality of possible end states based on the step of calculating the plurality of possible end states; and wherein the final end state is associated with a predicted subject vehicle action selected from a plurality of vehicle actions, the plurality of vehicle actions comprising going straight through the intersection, stopping at the intersection, and making a turn at the intersection;

initiating a providing of an alert through the collision warning system based on the predicted subject vehicle action;

comparing, by the ECU, the predicted subject vehicle action to the actual actions of the subject vehicle; and updating, by the ECU, probabilities between states of the subject vehicle based on the comparing of the predicted subject vehicle action to the actual actions of the subject vehicle.

37. The method according to claim 36, wherein the processing to calculate the plurality of possible end states of the subject vehicle is further based on a time to the intersection for the subject vehicle.

38. The method according to claim 36, wherein the step of processing, by the ECU, to calculate the plurality of possible end states of the subject vehicle comprises determining probabilities for each of the plurality of possible end states of the subject vehicle.

39. The method according to claim 38, wherein processing to predict the final end state of the plurality of possible end states is further based on the probabilities for each of the plurality of possible end states of the subject vehicle.

40. The method according to claim 39, wherein an end state of the plurality of possible end states of the subject vehicle with the highest probability is selected as the final end state of the plurality of possible end states predicted.

41. A method for estimating an unsafe condition, comprising the steps:

receiving, by an electronic control unit (ECU), data relating to a target vehicle, wherein the data relating to the target vehicle has been transmitted by the target vehicle;

receiving, by the ECU, data relating to a subject vehicle;

estimating a point in time that the target vehicle will arrive at an intersection based on the received data relating to the target vehicle;

estimating a point in time that a subject vehicle will arrive at the intersection based on the received data relating to the subject vehicle;

calculating, by the ECU, an initial state of the target vehicle based on the step of estimating the point in time that the target vehicle will arrive at the intersection;

calculating, by the ECU, an initial state of the subject vehicle based on the step of estimating the point in time that the subject vehicle will arrive at the intersection;

calculating, by the ECU, a plurality of possible end states of the target vehicle based on the initial state of the target vehicle and based on a distance of the target vehicle from the intersection, a current speed of the target vehicle, and an acceleration of the target vehicle;

predicting, by the ECU, a final end state of the plurality of possible end states of the target vehicle based on the step of calculating the plurality of possible end states;

wherein the final end state of the plurality of possible end states of the target vehicle is associated with a predicted target vehicle action selected from a plurality of vehicle actions, the plurality of vehicle actions comprising going straight through the intersection, stopping at the intersection, and making a turn at the intersection;

calculating, by the ECU, a plurality of possible end states of the subject vehicle based on the initial state of the subject vehicle and based on a distance of the subject vehicle from the intersection, a current speed of the subject vehicle, and an acceleration of the subject vehicle;

predicting, by the ECU, a final end state of the plurality of possible end states of the subject vehicle based on the step of calculating the plurality of possible end states of the subject vehicle;

wherein the final end state of the plurality of possible end states of the subject vehicle is associated with a predicted subject vehicle action selected from the plurality of vehicle actions; and providing an alarm based on the predicted target vehicle action and the predicted subject vehicle action and based on a comparison of the estimated point in time that the target vehicle will arrive at the intersection and on the estimated point in time that the subject vehicle will arrive at the intersection.

42. The method of claim 41, wherein estimating the point in time that the target vehicle and subject vehicle will arrive at an intersection includes considering the type of intersection.

43. The method of claim 41, wherein estimating the point in time that the target vehicle and subject vehicle will arrive at an intersection includes considering the relative directions of both the subject vehicle and the target vehicle.

44. The method of claim 41, wherein the step of calculating the plurality of possible end states of the target vehicle further includes determining probabilities that the target vehicle will make a left turn and right turn, and wherein the step of calculating the plurality of possible end states of the subject vehicle further includes determining probabilities that the subject vehicle will turn left and turn right.

45. The method of claim 41, wherein the step of predicting the final end state of the plurality of possible end states of the target vehicle further includes providing and updating probabilities after the target vehicle stops until the target vehicle exits the intersection, and wherein the step of predicting the final end state of the plurality of possible end states of the subject vehicle further includes providing and updating probabilities after the subject vehicle stops until the subject vehicle exits the intersection.

46. The method of claim 41, wherein the step of providing the alarm includes providing an alert when the target vehicle and the subject vehicle approach the same intersection at substantially the same time.

* * * * *